(12) United States Patent
Iwata et al.

(10) Patent No.: US 7,738,774 B2
(45) Date of Patent: Jun. 15, 2010

(54) RECORDING DEVICE AND PROXY-RECORDING DEVICE

(75) Inventors: Yoshiaki Iwata, Moriguchi (JP); Keiji Icho, Matsubara (JP); Kentaro Tanikawa, Kadoma (JP)

(73) Assignee: Panasonic Corporation, Osaka (JP)

( * ) Notice: Subject to any disclaimer, the term of this patent is extended or adjusted under 35 U.S.C. 154(b) by 1022 days.

(21) Appl. No.: 10/560,238

(22) PCT Filed: Jun. 7, 2004

(86) PCT No.: PCT/JP2004/008247

§ 371 (c)(1),
(2), (4) Date: Dec. 12, 2005

(87) PCT Pub. No.: WO2004/114302

PCT Pub. Date: Dec. 29, 2004

(65) Prior Publication Data

US 2007/0092203 A1  Apr. 26, 2007

(30) Foreign Application Priority Data

Jun. 24, 2003  (JP)  .............................. 2003-180049

(51) Int. Cl.
*H04N 5/91* (2006.01)
*H04N 7/00* (2006.01)
(52) U.S. Cl. .......................................... 386/83; 386/46
(58) Field of Classification Search ..................... 386/1, 386/46, 83, 109, 124–126
See application file for complete search history.

(56) References Cited

U.S. PATENT DOCUMENTS

| 6,370,316 | B1 * | 4/2002 | Yamada et al. ................. 386/46 |
| 7,224,886 | B2 * | 5/2007 | Akamatsu et al. .............. 386/83 |
| 7,254,318 | B2 * | 8/2007 | Imada et al. ................. 386/112 |
| 2001/0024562 | A1 | 9/2001 | Nomura et al. |
| 2002/0013945 | A1 | 1/2002 | Nashida et al. |
| 2002/0046404 | A1 | 4/2002 | Mizutani |
| 2003/0126607 | A1 | 7/2003 | Phillips et al. |
| 2004/0197074 | A1 | 10/2004 | Sagishima |
| 2005/0005308 | A1 * | 1/2005 | Logan et al. ................. 725/135 |

FOREIGN PATENT DOCUMENTS

| EP | 0 939 549 | 9/1999 |
| JP | 2001-346137 | 12/2001 |
| WO | 01/95621 | 12/2001 |
| WO | 03/003734 | 1/2003 |
| WO | 03/047235 | 6/2003 |

\* cited by examiner

*Primary Examiner*—Marsha D. Banks-Harold
*Assistant Examiner*—Marc Dazenski
(74) *Attorney, Agent, or Firm*—Wenderoth, Lind & Ponack, L.L.P.

(57) ABSTRACT

A recording device, which receives record instructions directly from a user, enables the user to give a variety of record instructions without being restricted by the recording capability of the recording device. The recording device judges whether a processing content specified in a record instruction received from the user is executable internally (step S300), and if judged in the negative, selects an external device capable of executing the record instruction, based pre-collected information relating to the recording capability of one or more external devices (step S302) and forwards the record instruction to the selected device (step S303).

14 Claims, 33 Drawing Sheets

FIG.4

400 PROGRAM TABLE

| PROGRAM ID 401 | GLOBAL CH. ID 402 | START DATE-TIME 403 | END DATE-TIME 404 |
|---|---|---|---|
| .. | .. | .. | .. |
| 021230047012000 | 04701 | 2002/12/30 20:00 | 2002/12/30 20:53 |
| 021230047012053 | 04701 | 2002/12/30 20:53 | 2002/12/30 21:00 |
| .. | .. | .. | .. |
| 021230089022000 | 08902 | 2002/12/30 20:00 | 2002/12/30 20:53 |
| 021230089022053 | 08902 | 2002/12/30 20:53 | 2002/12/30 21:00 |
| 021230089042000 | 08904 | 2002/12/30 20:00 | 2002/12/30 20:30 |
| .. | .. | .. | .. |

FIG.5

500 CHANNEL INFORMATION TABLE

| RECEIVABLE CH. REGION ID 47 (YOKOHAMA/KAWASAKI) 501 | GLOBAL CH. ID 502 |
|---|---|
| 1 | 04701 |
| 3 | 04702 |
| 4 | 04703 |
| 6 | 04706 |
| 8 | 04708 |
| 10 | 04710 |
| 12 | 04712 |
| 42 | 04742 |
| 46 | 04746 |

...

| RECEIVABLE CH. REGION ID 89 (OSAKA) 503 | GLOBAL CH. ID 504 |
|---|---|
| 2 | 08902 |
| 4 | 08904 |
| 6 | 08906 |
| 8 | 08908 |
| 10 | 08910 |
| 12 | 08912 |
| 19 | 08919 |
| 34 | 08934 |
| 36 | 08936 |

FIG.7

700 CRN-INDX CLASS. MASTER TABLE

| ID | CORNER INDEXING |
|---|---|
| 1 | OFF |
| 2 | SIMPLE |
| 3 | ADVANCED |
| ⋮ | ⋮ |

701 — ID column
702 — CORNER INDEXING column

FIG.8

800 CPT-RECOG CLASS. MASTER TABLE

| ID | CAPTION RECOGNITION |
|---|---|
| 1 | OFF |
| 2 | SIMPLE |
| 3 | ADVANCED |
| : | : |

FIG.9

900 IMG-QLTY CLASS. MASTER TABLE

| ID | IMAGE QUALITY |
|---|---|
| 1 | MPEG2 VBR |
| 2 | MPEG2 CBR |
| 3 | MPEG4 |
| 4 | MPEG4 AVC |
| 5 | MPEG2 VBR(HQ) |
| : | : |

(901, 902 label the ID and IMAGE QUALITY columns respectively)

FIG.10

1000 REC-PXY CAPABILITY LIST

1001 PXY-REC DEVICE ID:22360679

1002

| IMAGE QUALITY |
|---|
| MPEG2 VBR |
| MPEG2 CBR |
| MPEG4 |
| MPEG4 AVC |

| RECEIVABLE CH. REGION ID |
|---|
| 06 |
| 26 |
| 30 |

| SIM-REC NUMBER |
|---|
| 20 |

| CORNER INDEXING | CAPTION RECOGNITION |
|---|---|
| OFF | OFF |
| SIMPLE | SIMPLE |

⋮

1003 PXY-REC DEVICE ID:01200121

1004

| IMAGE QUALITY |
|---|
| MPEG2 VBR |
| MPEG3 VBR(HQ) |
| MPEG2 CBR |
| MPEG4 |
| MPEG4 AVC |

| RECEIVABLE CH. REGION ID |
|---|
| 01 |
| 02 |
| 03 |
| 04 |
| 07 |

| SIM-REC NUMBER |
|---|
| 12 |

| CORNER INDEXING | CAPTION RECOGNITION |
|---|---|
| OFF | OFF |
| SIMPLE | SIMPLE |
| ADVANCED | ADVANCED |

FIG.11

| PROGRAM ID | IMAGE QUALITY | SUPPLEMENTARY DATA | |
| --- | --- | --- | --- |
| | | CORNER INDEXING | CAPTION RECOGNITION |
| 021230008902200 | MPEG2 CBR | SIMPLE | OFF |

1100 RECORD PRESETTING CONTENT
1101 1102 1103 1104

FIG.12

1200 RECORD PRESETTING LIST

| PROGRAM ID | IMAGE QUALITY | SUPPLEMENTARY DATA | |
| --- | --- | --- | --- |
| 1201 | 1202 | CORNER INDEXING 1203 | CAPTION RECOGNITION 1204 |
| .. | .. | .. | .. |
| 021230089022000 | MPEG2 CBR | SIMPLE | OFF |
| 021230089022053 | MPEG4 | OFF | SIMPLE |
| .. | .. | .. | .. |

FIG.13

1300 REC-PXY REQUEST ACCEPTANCE LIST

| PROGRAM ID | PXY-MGMT ID | ... | PXY-REC DEVICE ID | IMAGE QUALITY | ... | SUPPLEMENTARY DATA | |
|---|---|---|---|---|---|---|---|
| | | | | | | CORNER INDEXING | CAPTION RECOGNITION |
| 02123004701 2000 | 0987654321ab | ... | 22360679 | MPEG2 CBR | ... | ADVANCED | OFF |
| 02123004701 2053 | 0987654321ad | ... | 01200121 | MPEG4 | ... | OFF | SIMPLE |
| ... | | | | | | | |

1400 RECORDING DATA ACQUISITION LIST

| PROGRAM ID | PXY-MGMT ID | PXY-REC DEVICE ID | IMAGE QUALITY | SUPPLEMENTARY DATA | |
| --- | --- | --- | --- | --- | --- |
| | | | | CORNER INDEXING | CAPTION RECOGNITION |
| 021230047012000 | 0987654321ab | 22360679 | MPEG2 CBR | ADVANCED | OFF |
| .. | .. | .. | .. | .. | .. |

FIG.15

1500 RECORDING PROXY CAPABILITY TABLE

1501 IMG-QLTY CAPABILITY SUBTABLE

| IMAGE QUALITY |
|---|
| MPEG2 VBR |
| MPEG2 CBR |
| MPEG4 |
| MPEG4 AVC |

1502 CH-RCPT CAPABILITY SUBTABLE

| RECEIVABLE CH. REGION ID |
|---|
| 06 |
| 26 |
| 30 |

1503 SIM-REC CAPABILITY SUBTABLE

| SIM-REC NUMBER |
|---|
| 20 |

1504 DAT-SUP CAPABILITY SUBTABLE

| CORNER INDEXING | CAPTION RECOGNITION |
|---|---|
| OFF | OFF |
| SIMPLE | SIMPLE |

FIG.16

1600 RECORDING-PROXY REQUEST MANAGEMENT TABLE

| PXY-MGMT ID (1601) | PXY-REC DEVICE ID (1602) | PROGRAM ID (1603) | IMAGE QUALITY (1604) | SUPPLEMENTARY DATA | |
|---|---|---|---|---|---|
| | | | | CORNER INDEXING (1605) | CAPTION RECOGNITION (1606) |
| .. | .. | .. | .. | .. | .. |
| 0987654321ab | 012345678 | 02123008906200 | MPEG2 CBR | SIMPLE | OFF |
| 0987654321ac | 173205081 | 02122604701170 | MPEG4 | SIMPLE | OFF |
| 0987654321ad | 314159265 | 02123108906212 | MPEG2 VBR | ADVANCED | ADVANCED |
| .. | .. | .. | .. | .. | .. |

FIG.17

1703 USER MANAGEMENT TABLE

| PXY-REC DEVICE ID | USAGE-AGREEMENT CONTENT 1701 | | | PXY-HIST INFO. 1702 | | |
|---|---|---|---|---|---|---|
| | COURSE | LIMIT | | COUNT | TIME | DATA VOL. |
| .. | .. | .. | .. | .. | .. | .. |
| 012345678 | DATA VOL. LIMIT | 20Gb | | 4 | 2 HR 45 MIN | 1.8G |
| 173205081 | USAGE-COUNT LIMIT | 30 TIMES | | 6 | 5 HR 40 MIN | 6Gb |
| .. | .. | .. | | .. | .. | .. |

FIG. 18

1800 USAGE-AGREEMENT MASTER TABLE

| COURSE | LIMIT | COURSE CONTENT |
|---|---|---|
| FLAT RATE | NONE | UNLIMITED USAGE |
| TIME LIMIT | 10 HRS | USAGE POSS. UP TO TIME LIMIT |
| | 20 HRS | |
| | 30 HRS | |
| USAGE-COUNT LIMIT | 10 TIMES | USAGE POSS. UP TO COUNT LIMIT |
| | 20 TIMES | |
| | 30 TIMES | |
| DATA VOL. LIMIT | 10Gb | USAGE POSS. UP TO DATA VOL. LIMIT |
| | 20Gb | |
| | 30Gb | |
| PAY-BY-USAGE | NONE | PAY BY NO. OF USAGES |
| PAY-BY-TIME | NONE | PAY BY TIME PERIOD USED |
| PAY-BY-VOLUME | NONE | PAY BY VOL. OF RECORDED DATA |
| ... | ... | ... |

FIG.19

1900 RECORDING DATA MANAGEMENT TABLE

| REC-DAT MGMT NAME<br>1901 | PROGRAM ID<br>1902 | IMAGE QUALITY<br>1903 | SUPPLEMENTARY DATA | | STORAGE ADDRESS<br>1906 |
|---|---|---|---|---|---|
| | | | CORNER INDEXING<br>1904 | CAPTION RECOGNITION<br>1905 | |
| 02123008906200_M2v_C0_T0.mpg | 02123008906200 | MPEG2 VBR | ADVANCED | OFF | xxx.yyy.zzz/RecDATA/‥ |
| 02123008906213_M2v_C0_T2.mpg | 02123008906213 | MPEG2 VBR | OFF | ADVANCED | xxx.yyy.zzz/RecDATA/‥ |
| ‥ | ‥ | ‥ | ‥ | ‥ | ‥ |

FIG.20

2000 RECORDING DATA ACQUISITION LIST

| REC-DAT MGMT NAME 2001 | PXY-MGMT ID 2002 | PXY-REC DEVICE ID 2003 |
|---|---|---|
| .. | .. | .. |
| 02123008906200_M2v_C2_T0.mpg | 0987654321ab | 012345678 |
| 02123008906223_M2v_C0_T0.mpg | 0987654321ad | 3141592 65 |
| .. | .. | .. |

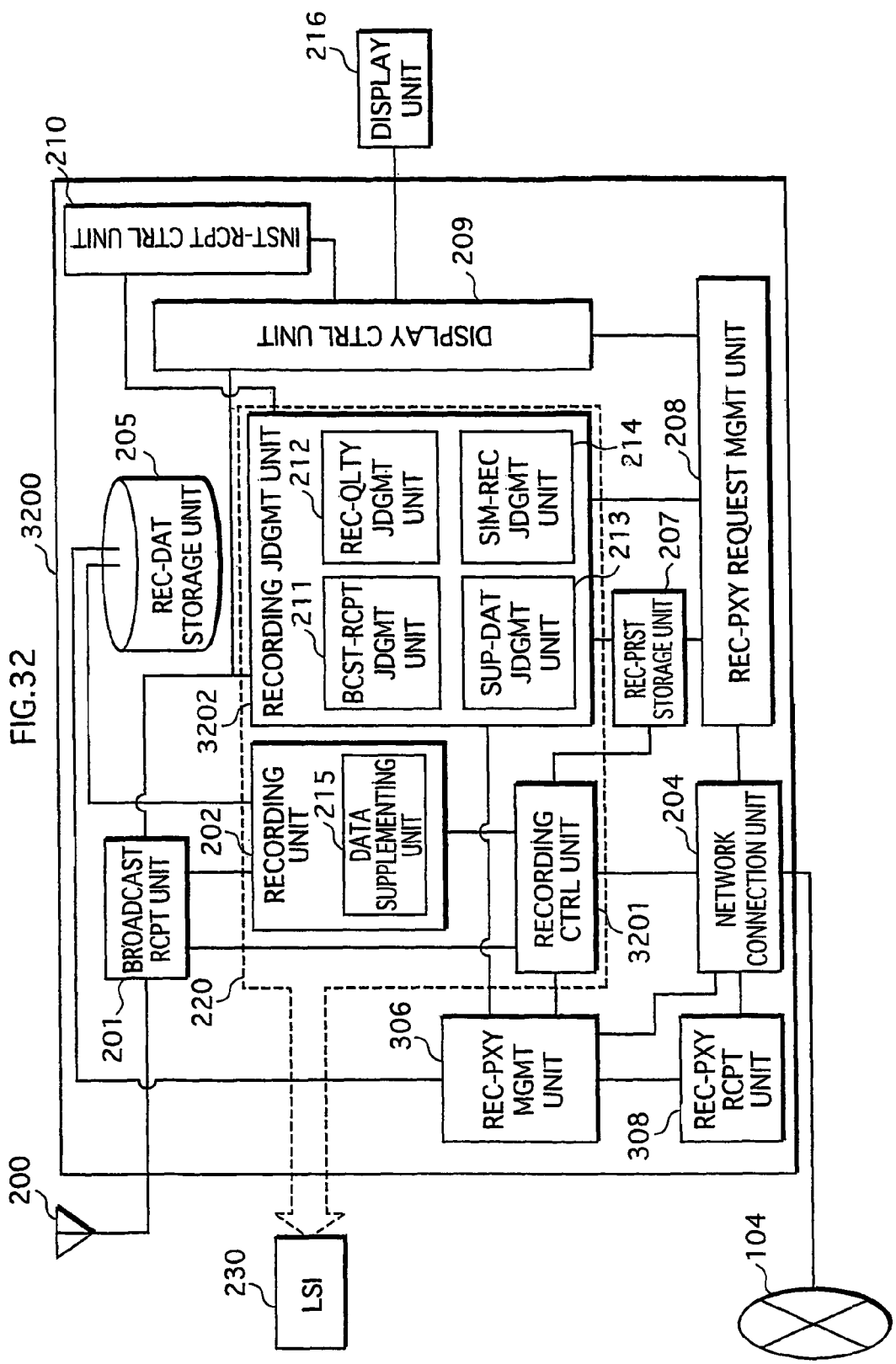

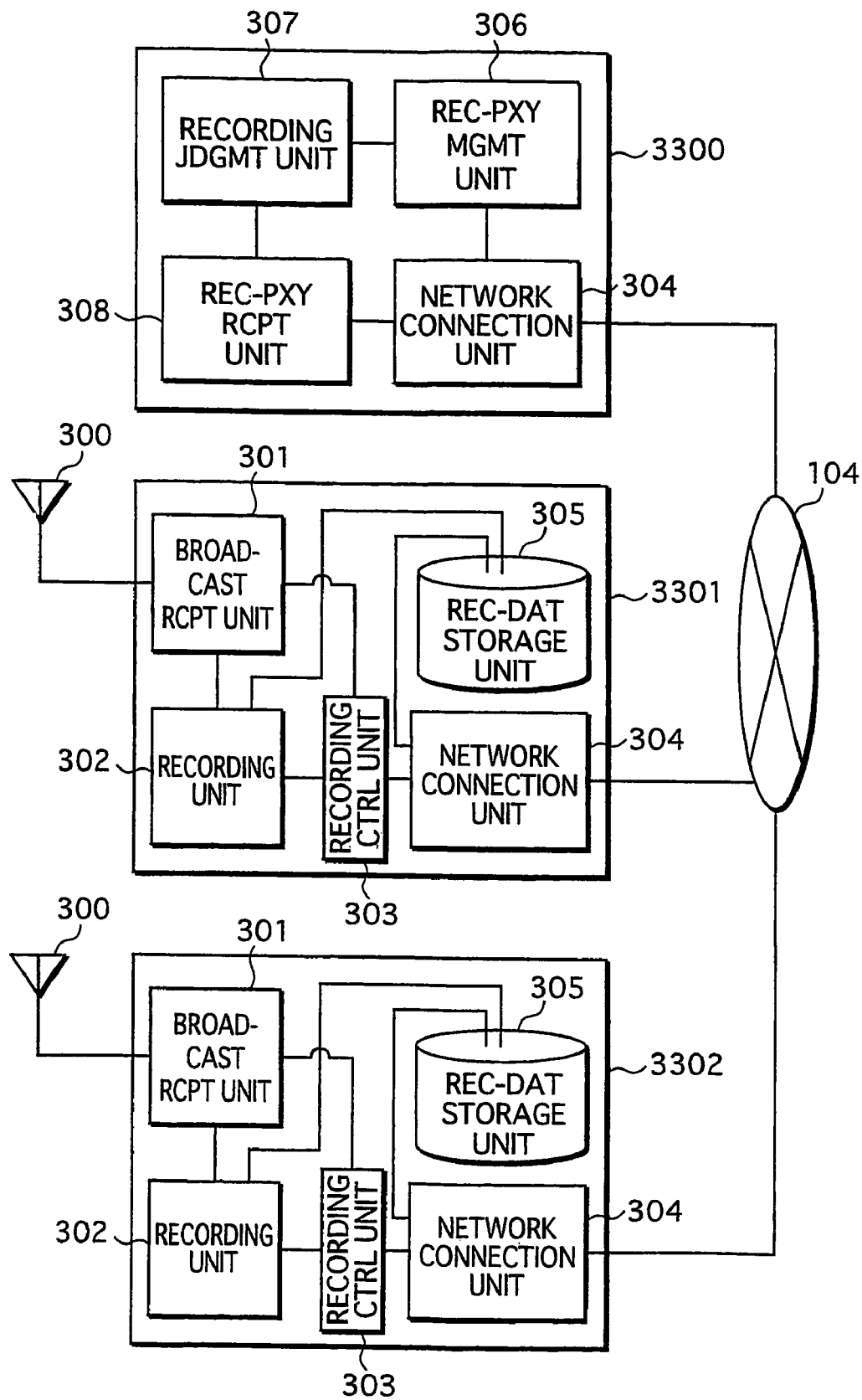

RECORDING DEVICE AND PROXY-RECORDING DEVICE

BACKGROUND OF THE INVENTION

1. Technical Field

The present invention relates to a recording device for receiving and recording broadcasted programs.

2. Background Art

Devices that record and store broadcast programs are in increasingly wide use following developments in digital technology and expansions in the capacity of storage media such as hard disk drives and DVDs in recent years. Various types of proxy-recording systems have also been developed in addition to these devices so as to allow for unforeseen events, including problems with the recording device that result in broadcast programs not being recorded.

In a proxy-recording system, a third party receives/records broadcast programs in accordance with record instructions from a user or a recording device, and provides the recorded programs to the user. Proposed systems include, for example, those that allow a user to instruct recording from outside the home, and those that automatically request a proxy recording service to perform recording when a recording device failure is detected.

Furthermore, recent advances in recording technologies, such as video compression technology typified by MPEG (Moving Picture Experts Group) and automatic video-indexing technology, have given rise to demands to use particular recording methods employing these technologies for particular recording needs.

Exemplary usages include appending indexes to video data when recording news programs, recording science programs at high image-quality MPEG2, and recording broadcast programs using MPEG4 to enable programs to be viewed on a mobile telephone.

However, this diversification of the demands relating to recording methods means that the desired result may not be obtainable due to the user's recording device or a recording service not being able to record using the method sought by the user. In such cases, the user needs to reissue the record instruction to another recording device that can record using the desired method, which is troublesome and time consuming.

BRIEF SUMMARY OF THE INVENTION

In view of the above issue, the present invention aims to provide a recording device capable of responding to a diverse range of recording requests from a user, without being troublesome and time consuming to use.

A recording device that achieves this object includes: a receiving unit operable to receive, from a user, a record instruction specifying a processing content for recording a broadcast program; a collecting unit operable to collect second capability information relating to a recording capability of one or more external devices; a judging unit operable to determine, with reference to prestored first capability information relating to a recording capability of the recording device, whether the recording device is capable of recording in accordance with the processing content; a recording unit operable, if determined in the affirmative, to receive and record the broadcast program in accordance with the processing content; a selecting unit operable, if determined in the negative, to select an external device capable of recording in accordance with the processing content, based on the collected second capability information; and a communication unit operable to convey the record instruction to the selected external device.

According to this configuration, a recording device that is unable to perform recording in accordance with a record instruction received directly from a user searches for an optimal recording device capable of carrying out the instruction and transfers the instruction to the selected recording device, thus making it possible for the user to give record instructions specifying a wide variety of processing contents, without being restricted by the capabilities of the recording device to which the user directly issues the record instruction.

Here, the processing content may include information specifying an image quality, the first capability information may include information showing an image quality at which the recording device is capable of recording, the second capability information may include information showing an image quality at which the one or more external devices are capable of recording, the judging unit may determine, with reference to the first capability information, whether the recording device is capable of recording at the specified image quality, and the selecting unit may select an external device capable of recording at the specified image quality, based on the second capability information, if determined in the negative.

According to this configuration, as long as there is another recording device connected to the network that is able to record at the image quality specified in a record instruction, the instruction can be carried out even if the user's recording device is unable to record at the specified image quality, thus enabling a wider range of record instructions to be given than can be handled by the user's own recording device.

Here, the processing content may include information specifying supplementary data for adding to the processing content, the first capability information may include information showing supplementary data with which the recording device is capable of recording, the second capability information may include information showing supplementary data with which the one or more external devices are capable of recording, the judging unit may determine, with reference to the first capability information, whether the recording device is capable of recording with the addition of the specified supplementary data, and the selecting unit may select an external device capable of recording with the addition of the specified supplementary data, based on the second capability information, if determined in the negative.

According to this configuration, as long as there is another recording device connected to the network that is able to record with the supplementary data included, the instruction can be carried out even if the user's recording device is unable to record with the supplementary data added to recording data, thus enabling a wider range of record instructions to be given than can be handled by the user's own recording device.

Here, the processing content may include information specifying the broadcast program for recording, the first capability information, may include information showing a broadcast program receivable by the recording device, the second capability information may include information showing a broadcast program receivable by the one or more external devices, the judging unit may determine, with reference to the first capability information, whether the recording device is capable of receiving the specified broadcast program, and the selecting unit may select an external device capable of receiving the specified broadcast program, based on the second capability information, if determined in the negative.

According to this configuration, as long as there is another recording device connected to the network that is able to receive the broadcast program specified in a record instruction, the instruction can be carried out even if the user's recording device is unable to receive the specified broadcast program, thus enabling a wider range of record instructions to be given than can be handled by the user's own recording device.

Here, the processing content may include information specifying a broadcast time of the broadcast program for recording, the first capability information may include information for use in determining whether the recording device is capable of recording at the specified broadcast time, the second capability information may include information for use in judging whether the one or more external devices are capable of recording at the specified broadcast time, the judging unit may determine, with reference to the first capability information, whether the recording device is capable of recording at the specified broadcast time, and the selecting unit may select an external device capable of recording at the specified broadcast time, based on the second capability information, if determined in the negative.

According to this configuration, as long as there is another recording device connected to the network that is able to record the broadcast program specified in a record instruction, the instruction can be carried out even if the user's recording device is unable to perform the recording due to restrictions on the number of programs that can be simultaneously recorded, thus enabling a wider range of record instructions to be given than can be handled by the user's own recording device.

Here, the recording device may further include: a requesting unit operable to request the external device to which the communication unit conveyed the record instruction, to send the recorded broadcast program; and a second recording unit operable to receive the broadcast program transmitted from the external device in response to the request, and to record the received broadcast program to a recording medium.

According to this configuration, a user is able to acquire recording data generated as a result of a record instruction given by the user, thus enabling the user to obtain recording data relating to a recording content that could not be obtained from the recording device to which the record instruction was directly issued.

The recording device may further include: a capability-disclosing unit operable to convey the first capability to an external device; a proxy-receiving unit operable to receive, from the external device, a record instruction specifying a processing content for recording a broadcast program; and a proxy-recording unit operable to receive and record the broadcast program to a recording medium, in accordance with the record instruction received from the external device.

According to this configuration, it is possible to create recording data by combining the recording functions of a plurality of recording devices having different recording functions connected to a home network, for example, irrespective of which device actually receives the record instruction directly from the user.

Here, the recording device may further include a recording-execution unit operable to select, with reference to the first and second capability information, a device from out of the recording device and the one or more external devices that is able to record at a capability closest to the processing content, if the judging unit determines in the negative and none of the one or more external devices are able to execute the processing content.

A proxy-recording device that achieves the above object includes: a capability-disclosing unit operable to convey, to an external device, capability information relating to a recording capability of the proxy-recording device; a proxy-receiving unit operable to receive, from the external device, a record instruction specifying a processing content for recording a broadcast program; and a proxy-recording unit operable to receive and record the broadcast program to a recording medium, in accordance with the record instruction.

According to this configuration, an external device is able to acquire information relating to the recording capabilities of the proxy-recording device, thus enabling the external device to judge, based on the acquired information, whether or not the proxy-recording device is capable of performing the desired recording operation. Then, by transmitting a record instruction specifying the processing content to the proxy-recording device, the external device is able to have the proxy-recording device perform the recording in accordance with the record instruction.

Here, the capability information may include information showing an image quality at which the proxy-recording device is capable of recording, the processing content may include information specifying an image quality, and the proxy-recording unit may perform the recording at the specified image quality.

Here, the capability information may include information showing supplementary data with which the proxy-recording device is capable of recording, the processing content may include information specifying supplementary data for adding to the processing content, and the proxy-recording unit may perform the recording with the addition of the specified supplementary data.

Here, the capability information may include information showing a broadcast program receivable by the proxy-recording device, the processing content may include information specifying the broadcast program for recording, and the proxy-recording unit may receive the specified broadcast program and perform the recording.

Here, the processing content may include information specifying a broadcast time of the broadcast program for recording, the capability information may include information for use in determining whether the proxy-recording device is capable of recording at the specified broadcast time, and the proxy recording unit may perform the recording at the specified broadcast time, if determined in the affirmative.

Here, the proxy-recording device may further include a transmission unit operable to send the broadcast program recorded on the recording medium to the external device.

BRIEF DESCRIPTION OF THE DRAWINGS

FIG. 4 shows an exemplary structure and content of a program table 400 stored in recording judgment units 206 and 307 of devices 100 and 101, respectively;

FIG. 5 shows an exemplary structure and content of a channel information table 500 stored in recording judgment units 206 and 307;

FIG. 7 shows an exemplary structure and content of a corner-indexing classification master table 700 stored in recording judgment units 206 and 307;

FIG. 8 shows an exemplary structure and content of a caption-recognition classification master table 800 stored in recording judgment units 206 and 307;

FIG. 9 shows an exemplary structure and content of an image-quality classification master table 900 stored in recording judgment units 206 and 307;

FIG. 10 shows an exemplary structure and content of a recording-proxy capability table 1000 stored in a recording-proxy request management unit 208;

FIG. 11 shows an exemplary structure and content of a record-presetting content 1100 generated by an instruction-reception control unit 210 of recording device 100 when a record instruction is received from a user;

FIG. 12 shows an exemplary structure and content of a record-presetting list 1200 stored in a record-presetting storage unit 207 of recording device 100;

FIG. 13 shows an exemplary structure and content of a recording-proxy request acceptance list 1300 stored in recording-proxy request management unit 208;

FIG. 14 shows an exemplary structure and content of a recording-data acquisition list 1400 stored in recording-proxy request management unit 208;

FIG. 15 shows an exemplary structure and content of a recording-proxy capability table 1500 stored in recording judgment unit 307;

FIG. 16 shows an exemplary structure and content of a recording-proxy request management table 1600 stored in a recording-proxy management unit 306 of proxy-recording device 101;

FIG. 17 shows an exemplary structure and content of a user management table 1703 stored in a recording-proxy reception unit 308 of proxy-recording device 101;

FIG. 18 shows an exemplary structure and content of a usage-agreement management table 1800 stored in recording-proxy reception unit 308;

FIG. 19 shows an exemplary structure and content of a recording-data management table 1900 stored in recording-proxy management unit 306;

FIG. 20 shows an exemplary structure and content of a recording-data acquisition list 2000 stored in recording-proxy management unit 306;

FIG. 32 shows a functional structure of a recording device 3200 having a proxy recording function in an embodiment 2; and FIG. 33 shows an exemplary variation of the functional structure of proxy-recording device 101.

DETAILED DESCRIPTION OF THE INVENTION

Embodiments of the present invention are described below with reference to the drawings.

Embodiment 1

Structure

Figure 1:
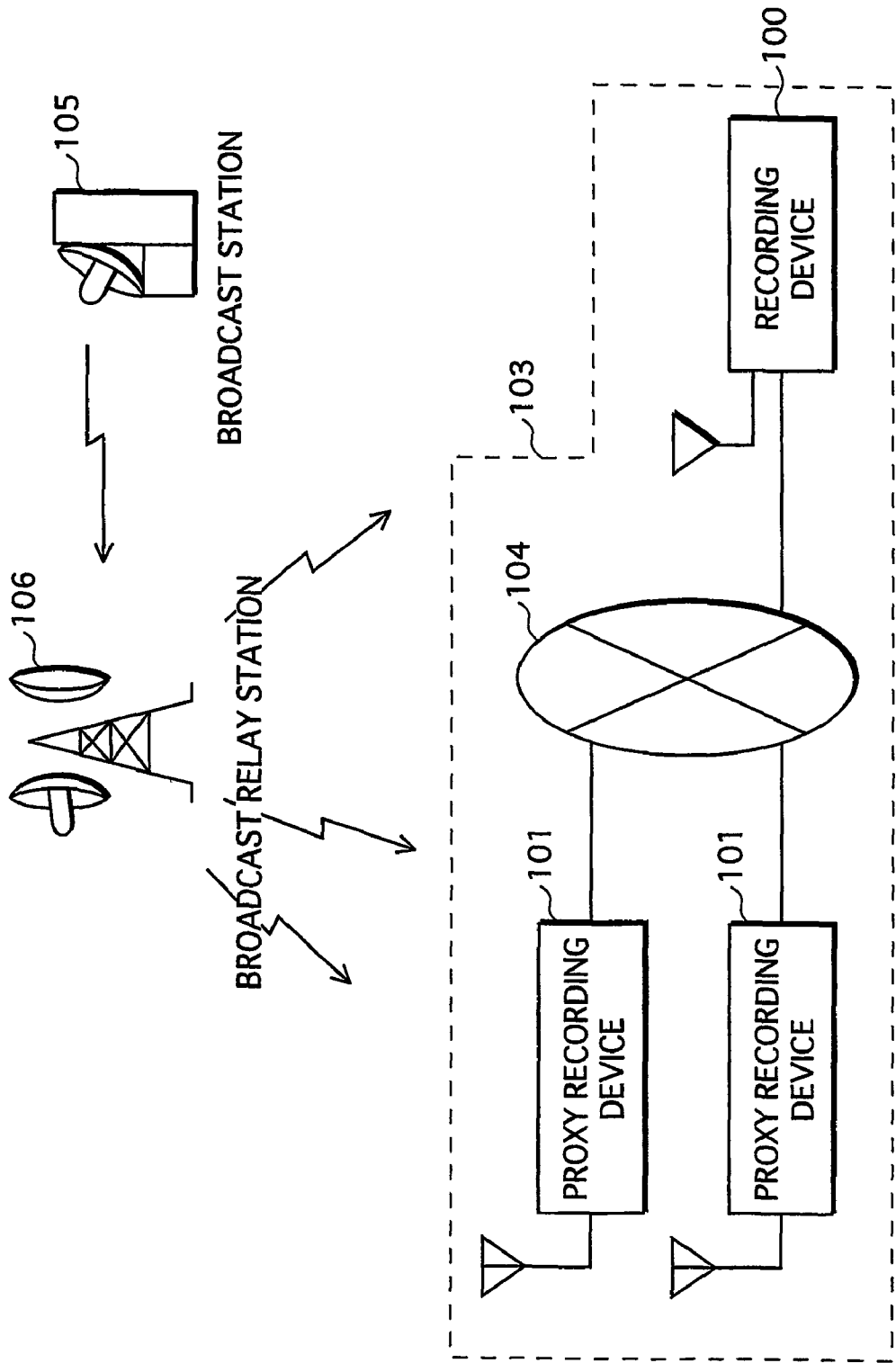
FIG. 1 schematically shows a structure of a proxy-recording system 103 constituted from a recording device 100 and a plurality of proxy-recording devices 101 in an embodiment 1.

FIG. 1 schematically shows a structure of a proxy-recording system 103 constituted from a recording device 100 and one or more proxy-recording devices 101 in an embodiment 1. Apart from proxy-recording system 103, FIG. 1 also shows a broadcast station 105 that emits broadcast waves and a broadcast relay station 106 that relays broadcast waves.

Proxy-recording system 103 is constituted from a recording device 100 and one or more proxy-recording devices 101 that are mutually connected via a communication network 104 (e.g. the Internet). System 103 makes it possible, with respect to the user of device 100, for a broadcast program preset for recording to be recorded and stored in a proxy-recording device in the event that device 100 is not able to execute the record-presetting content.

In the present embodiment, broadcast station 105 is presumed to be a broadcast station that transmits digital broadcasts in compliance with ISO/IEC 13818-1 and ARIB (Association of Radio Industries and Businesses) STD-B10. Broadcast programs consisting of video, audio and other data are multiplexed with service information (SI) such as event information tables (EIT) before being transmitted. Service information may include electronic program guides (EPG). Users are able, for example, to preset the recording of broadcast programs with reference to an EPG.

Broadcast relay station 106 functions to relay broadcast waves between broadcast station 105 and devices 100 and 101.

Recording device 100 functions to receive broadcast programs transmitted from broadcast relay station 106, and to record (i.e. save) received broadcast programs to recording media in accordance with record instructions from a user.

Proxy-recording devices 101 function to receive broadcast programs transmitted from broadcast relay station 106 and record (i.e. save) received broadcast programs to recording media, and to record broadcast programs in accordance with record instructions from recording device 100 and provide recording data to a source (e.g. device 100) that requests acquisition of the recording data.

Proxy-recording devices 101 are mutually connected to recording device 100 via communication network 104, which is, for example, at least one of a wide area network (WAN) such as the Internet and a local area network (LAN) such as a home network. TCP/IP (Transmission Control Protocol/Internet Protocol) may be used as a communication protocol in these communication networks, in which case HTTP (Hypertext Transfer Protocol) request and response, FTP (File Transfer Protocol) file transfer, and sending and receiving email based on SMTP/POP3 (Simple Mail Transfer Protocol/Post Office Protocol Version 3) are, for example, possible. A proxy-recording device 101 holds a device ID for uniquely identifying itself (i.e. device 101), and is able to communicate with specified target devices and perform data processing.

Note that to facilitate description FIG. 1 shows a partial structure of proxy-recording system 103. In the actual system, a plurality of recording devices and proxy-recording devices having substantially the same respective structures as devices 100 and 101 are connected via communication network 104.

Figure 2:
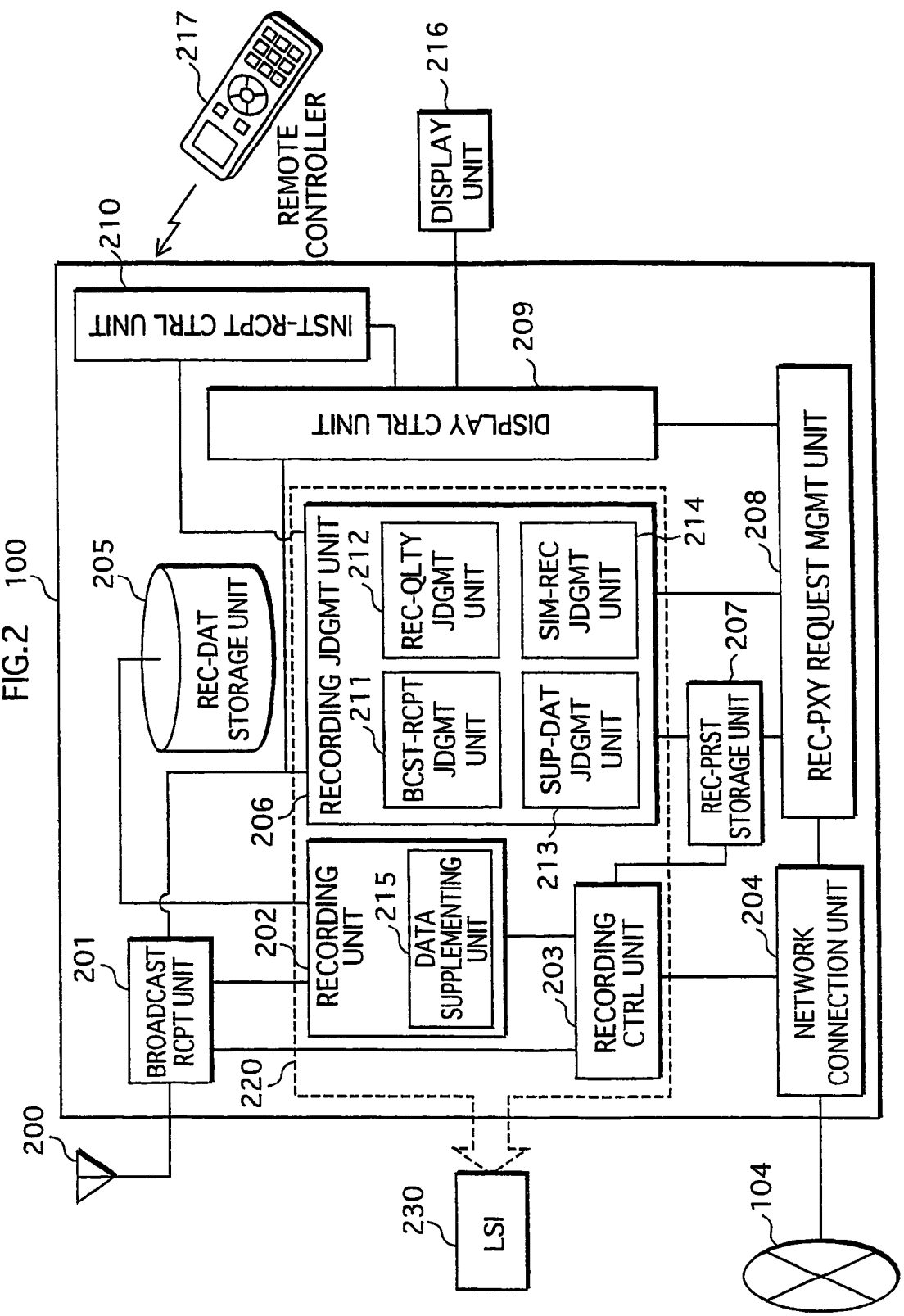
FIG. 2 shows a functional structure of recording device 100.
Figure 3:
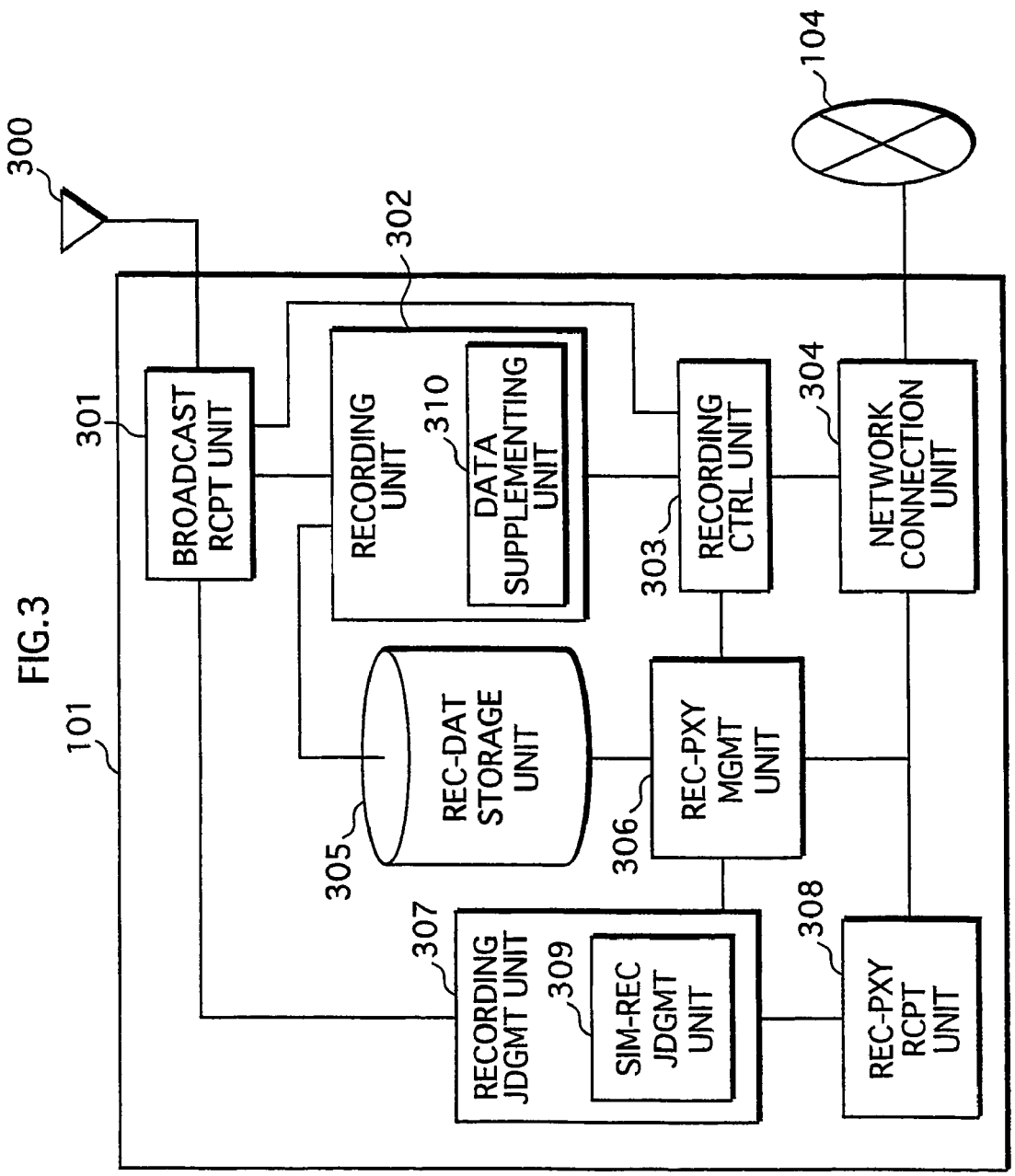
FIG. 3 shows a functional structure of proxy-recording device 101.

FIGS. 2 and 3 show functional structures of recording device 100 and proxy-recording device 101, respectively.

Structure of Recording Device 100

Firstly, recording device 100 is described using FIG. 2. Device 100 is, specifically, a so-called set-top box that includes a memory, a CPU, a tuner, a transport stream (TS) decoder, an MPEG decoder, an MPEG encoder, and the like, to which is added a large-capacity storage medium such as a hard-disk drive so as to provide device 100 with a recording function. Device 100 has the basic function of receiving and recording broadcast programs in response to user operations.

As shown in FIG. 2, recording device 100 includes a broadcast reception unit 201, a recording unit 202, a recording control unit 203, a network connection unit 204, a recording data (REC-DAT) storage unit 205, a recording judgment unit 206, a recording-proxy (REC-PXY) request management unit 208, an instruction reception (INST-RCPT) control unit 210, a display control unit 209, and a record-presetting (REC-PRST) storage unit 207.

Here, broadcast reception unit 201, which is constituted from a tuner, a TS decoder, and an MPEG decoder, functions to select channels, to receive modulated digital broadcasts via an antenna 200 and demodulate the received digital broadcasts, to extract specific video and audio stream data and service information from transport streams obtained as a result of the demodulation, to decompress compressed video and audio stream data using the MPEG decoder, and to send the obtained video and audio signals to recording unit 202. Unit 201 also functions to convey extracted service information to recording judgment unit 206 and display control unit 209.

Recording unit 202, under the control of recording control unit 203, functions to compress video and audio signals outputted from broadcast reception unit 201 using the MPEG encoder, and to record video and audio stream data obtained as a result of the compression to REC-DAT storage unit 205. When recording data has been conveyed from network connection unit 204, unit 202 functions to record the data to unit 205. Unit 202 also includes a data supplementing unit 215 that adds data specified by recording control unit 203 to recording data, as described in detail in a later section. This supplementary data may be added during or after the recording.

Note that although broadcast reception unit 201 is described above as decoding compressed video and audio stream data and sending the result to recording unit 202, which compresses the received video and audio signals and stores the result in REC-DAT storage unit 205, the following is also possible. That is, unit 201 may send compressed video and audio stream data extracted from transport streams to unit 202 without decoding, and unit 202 may store the received stream data in unit 205 in a compressed state.

Recording control unit 203 functions to convey instructions to record broadcast programs to broadcast reception unit 201 and recording unit 202 based on record presetting information stored in REC-PRST storage unit 207, and to convey record instructions to recording unit 202 in the event of record data being received via network connection unit 204.

REC-DAT storage unit 205 is a hard disk used for saving the video and audio stream data of broadcast programs.

Network connection unit 204, which is a LAN connection unit that includes an IEEE 1394 connector and the like, is connected to a data communication control device via a LAN cable, and functions to communicate with proxy-recording device 101 via a network.

Recording judgment unit 206, as described in detail in a later section, functions to determine the content of record presettings (i.e. settings that relate to unattended recording, timer recording, registration of recording programs, etc.) conveyed from INST-RCPT control unit 210, and to convey record instructions to REC-PXY request management unit 208 according to the presetting content. Unit 206 also functions to record the presetting content to REC-PRST storage unit 207 and to update the content of unit 207 when instructed. Unit 206 furthermore functions to accumulate service information received from broadcast reception unit 201, and to store data relating to the recording function of proxy-recording device 101 as conveyed from REC-PXY request management unit 208. A detailed description of this data is given in a later section.

Recording judgment unit 206 includes four judgment units, these being an image recording quality (REC-QLTY) judgment unit 212, a simultaneous recording (SIM-REC) judgment unit 214, a broadcast reception (BCST-RCPT) judgment unit 211, and a supplementary data (SUP-DAT) judgment unit 213.

REC-QLTY judgment unit 212 functions, in the case of the image quality being specified in a received record presetting, to determine whether recording at the specified image quality is possible.

When a received record presetting is to be executed, SIM-REC judgment unit 214 functions to determine whether recording is possible without exceeding the maximum number of simultaneous recordings permitted of recording device 100.

BCST-RCPT judgment unit 211 functions to determine whether reception of the broadcast program specified in a received record presetting is possible.

SUP-DAT judgment unit 213 functions, in the case of supplementary data being specified in a received record presetting, to determine whether recording is possible with the supplementary data included.

INST-RCPT control unit 210, which is part of the user interface that receives input operations from the user, functions to receive remote instruction operations from the user via an infrared remote controller 217 (hereinafter "remote 217"), for example, and to instruct recording judgment unit 206 and display control unit 209 in accordance with the content of received instructions and have units 206 and 209 execute the instructions.

In the case of EPG display being instructed by the user, INST-RCPT control unit 210 functions to instruct display control unit 209 to perform processing to acquire service information such as an event information table (EIT) from broadcast reception unit 201 and display an EPG.

Display control unit 209 functions to control a display unit 216 to display the current content of settings and the EPG on the basis of information conveyed from INST-RCPT control unit 210, recording judgment unit 206, and broadcast reception unit 201. Display unit 216, which is part of the user interface, is constituted from an LED (liquid crystal display), an indicator, a monitor, and the like.

REC-PRST storage unit 207 is a memory area for storing information that shows broadcast programs for recording.

REC-PXY request management unit 208 functions to transmit/receive signals for instructing proxy-recording device 101 to perform recording, based on record instructions conveyed from recording judgment unit 206. Unit 208 also functions to request device 101 for the transmission of recording data and receive the requested data. Unit 208 furthermore functions to collect data from device 101 relating to the recording function of device 101 and convey collected data to unit 206.

Note that recording judgment unit 206, recording control unit 203, REC-PXY request management unit 208, display control unit 209, and recording unit 202 may be constituted as functional units realized by software; that is, the functions of these units may be realized by a CPU executing control computer programs stored in memory.

The functional blocks consisting of recording judgment unit 206, recording control unit 203, REC-PXY request management unit 208, recording unit 202 and the like are typically realized as LSIs (large-scale integration). These blocks may be realized as discrete LSIs or as a system LSI that includes some or all of the blocks. As shown in FIG. 2, for example, recording judgment unit 206, recording control unit 203 and recording unit 202 may be constituted as a single LSI 230 included in the area 220 marked by the broken lines.

The LSI given here as an example may be referred to as an IC (integrated circuit), a system LSI, a super LSI, or an ultra LSI, depending on the degree of integration.

The integration method is not limited to large-scale integration, and may be realized by a dedicated circuit or a general-purpose processor. Alternatively, a FPGA (field programmable gate array) programmable after the LSI has been manufactured, a reconfigurable processor capable of reconfiguring the connections and settings of circuit cells within an LSI, or the like, may be employed. Also, if integration technology that replaces large-scale integration becomes available as a result of advances in semiconductor technology or the advent of derivative technology, the integration of the functional blocks may naturally be performed using this technology. For example, the application of biotechnology or the like in this area is a possibility.

Structure of Proxy-Recording Device 101

Next, proxy-recording device 101 is described using FIG. 3. Device 101 is specifically a so-called set-top box that includes a memory, a CPU, a tuner, a TS decoder, an MPEG decoder, an MPEG encoder, and the like, to which is added a large-capacity storage medium such as a hard-disk drive so as to provide device 101 with a recording function. Device 101 has the basic function of receiving and recording broadcast programs.

As shown in FIG. 3, proxy-recording device 101 includes a broadcast reception unit 301, a recording unit 302, a recording control unit 303, a network connection unit 304, a recording-data (REC-DAT) storage unit 305, a recording judgment unit 307, a recording-proxy (REC-PXY) reception unit 308, and a recording-proxy (REC-PXY) management unit 306.

Here, broadcast reception unit 301, which is constituted specifically from a tuner, a TS decoder, and an MPEG decoder, functions to select channels, to receive modulated digital broadcasts via an antenna 300 and demodulate the received digital broadcasts, to extract specific video and audio stream data and service information from transport streams obtained as a result of the demodulation, to decompress compressed video and audio stream data using the MPEG decoder, and to send the obtained video and audio signals to recording unit 302. Unit 301 also functions to convey extracted service information to recording judgment unit 307.

Recording unit 302, under the control of recording control unit 303, functions to compress video and audio signals outputted from broadcast reception unit 301 using the MPEG encoder, and to record video and audio stream data obtained as a result of the compression to REC-DAT storage unit 305. When recording data has been conveyed from network connection unit 304, unit 302 functions to record the data to unit 305. Unit 302 also includes a data supplementing unit 310 that adds data specified by recording control unit 303 to recording data, as described in detail in a later section. This supplementary data may be added during or after the recording.

Note that although broadcast reception unit 301 is described above as decoding compressed video and audio stream data and sending the result to recording unit 302, which compresses the received video and audio signals and stores the result in REC-DAT storage unit 305, the following is also possible. That is, unit 301 may send compressed video and audio stream data extracted from transport streams to unit 302 without decoding, and unit 302 may store the received stream data in unit 305 in a compressed state.

Recording control unit 303 functions to convey instructions to record broadcast programs to broadcast reception unit 301 and recording unit 302 based on recording-proxy (REC-PXY) presetting information stored in REC-PXY management unit 306.

REC-DAT storage unit 305 is a hard disk used for saving the video and audio stream data of broadcast programs.

Network connection unit 304, which is specifically a LAN connection unit that includes an IEEE 1394 connector and the like, is connected to a data-communication control device via a LAN cable, and functions to communicate with recording device 100 via a network.

Recording judgment unit 307, as described in detail in a later section, functions to determine the content of record instructions conveyed from REC-PXY reception unit 308, and to convey the content of these record instructions to REC-PXY management unit 306, or to convey signals to recording device 100 rejecting record instructions received from device 100. Unit 307 also functions to store EPGs received from broadcast reception unit 301.

Recording judgment unit 307 includes a simultaneous-recording (SIM-REC) judgment unit 309. When a record instruction conveyed from REC-PXY reception unit 308 is to be executed, SIM-REC judgment unit 309 functions to determine whether recording is possible without exceeding the maximum number of simultaneous recordings permitted of proxy-recording device 101.

REC-PXY reception unit 308 functions to receive record instructions from recording device 100, and to convey the content of these instructions to recording judgment unit 307.

REC-PXY management unit 306 functions to transmit data relating to the recording function of proxy-recording device 101 to recording device 100, to accumulate the instruction content conveyed from recording judgment unit 307, and also to transmit to device 100 in response to requests from device 100, information relating to the storage addresses of recording data.

Note that recording judgment unit 307, REC-PXY reception unit 308, recording control unit 303, recording unit 302, and REC-PXY management unit 306 may be constituted as functional units realized by software; that is, the functions of these units may be realized by a CPU executing computer programs stored in memory.

Data: Recording Device 100

Described below is the principle data handled in recording device 100.

FIG. 4 shows an exemplary structure and content of a program table 400 stored in recording judgment unit 206. As shown in FIG. 4, table 400 is structured to include a program ID 401, a global channel ID 402, and start and end date-times 403 and 404. Here, each program ID is a code (e.g. a known G code) uniquely identifying one out of a large number of broadcast programs. This code may, as shown in channel information table 500 in FIG. 5, be constituted from a known region ID indicating a broadcast region and one or more channel numbers receivable in the broadcast region. The FIG. 5 example shows the receivable channels (501, 503) and global channel IDs (502, 504) for the areas identified by the region IDs "47" and "89". This information, which is needed for identifying individual broadcast programs, is obtained by broadcast reception unit 201 from EPGs and the like and stored in recording judgment unit 206.

Start and end date-times 403 and 404 indicate the dates and times at which the broadcast of programs identified by the program IDs start and end.

Figure 6:
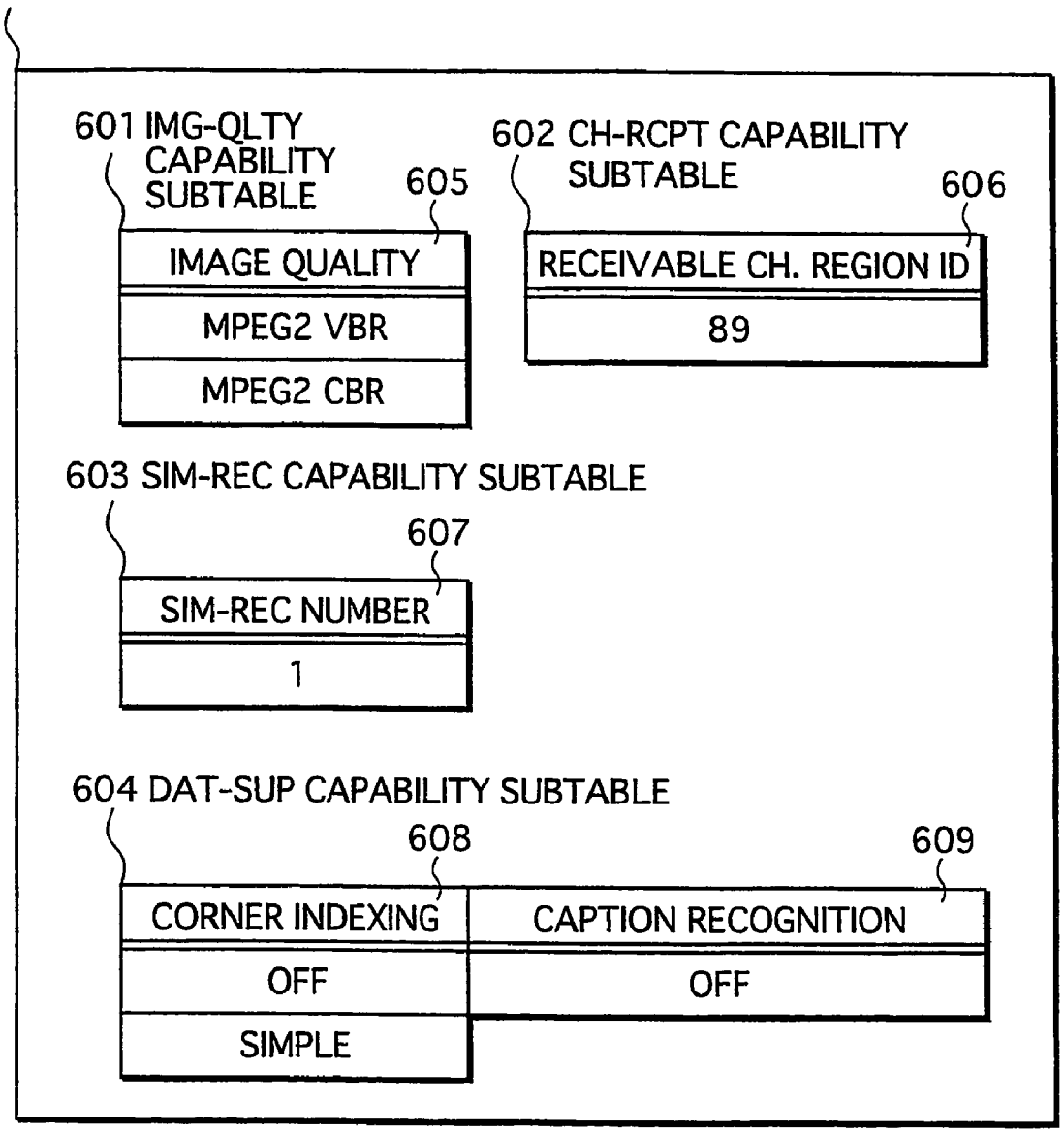
FIG. 6 shows an exemplary structure and content of a recording capability table 600 stored in recording judgment unit 206.

FIG. 6 shows an exemplary structure and content of a recording capability table 600 stored in recording judgment unit 206. The information in this table, which is set prior to recording device 100 being shipped, is data that relates to the recording function of device 100, showing the capability of device 100 with respect to a series of processing operations related to recording.

As shown in FIG. 6, recording capability table 600 is structured to include image-quality (IMG-QLTY) capability subtable 601, a channel-reception (CH-RCPT) capability subtable 602, a simultaneous-recording (SIM-REC) capability subtable 603, and a data-supplementing (DAT-SUP) capability subtable 604.

IMG-QLTY capability subtable 601 is information showing an image quality 605 at which recording device 100 is able to perform recording. In the given example, device 100 is shown to be capable of recording at two image qualities; namely, MPEG2 VBR (variable bit rate) and MPEG2 CBR (constant bit rate).

As shown in an image-quality (IMG-QLTY) classification master table 900 in FIG. 9, image quality 605 is managed using image quality types 902 and IDs 901 that uniquely identify the image quality types, with respect to both devices 100 and 101. Master table 900 is stored in recording judgment unit 206.

CH-RCPT capability subtable 602 shows the region IDs 606 (described above) of channels receivable by recording device 100. In the given example, device 100 is shown as being capable of receiving channels in the area identified by the region ID "89".

SIM-REC capability subtable 603 shows a simultaneous recording (SIM-REC) number 607, which is the number of broadcast programs simultaneously recordable by recording device 100. SIM-REC number 607 is restricted mainly by the number of tuners provided in device 100. SIM-REC number 607 in the given example is "1".

DAT-SUP capability subtable 604 is information showing data that can be added to the recording data when broadcast programs are recorded. Corner indexing 608 and caption recognition 609 are given as examples of supplementary information in the present embodiment. Corner indexing 608, which is a known basic motion-analysis processing operation, is technology for detecting scenes in broadcast programs in which the corner changes and using detected scenes in video indexing. Corner indexing of video data can, for example, be classified into "off", "simple" and "advanced" settings, depending on the level of detection. In the FIG. 6 example, recording device 100 is shown in table 604 as being able to perform corner indexing at the settings "off" and "simple".

As shown in a corner-indexing (CNR-INDX) classification master table 700 in FIG. 7, corner indexing 608 is managed using corner indexing 702 and IDs 701 that uniquely identify the different detection levels, with respect to both devices 100 and 101. Master table 700 is stored in recording judgment unit 206.

Caption recognition 609 is known technology for recognizing character information displayed on the screen during the broadcast of a program and extracting this information of use in video indexing. The recognition of character information from video can classified into "off", "simple" and "advanced" setting, depending on the level of recognition. Since only the "off" setting is entered in table 604 in the FIG. 6 example, recording device 100 is shown as not being capable of caption recognition.

As shown in a caption-recognition (CPT-RECOG) classification master table 800 in FIG. 8, caption recognition 609 is managed using caption recognition 802 and IDs 801 that uniquely identify the different recognition levels, with respect to both devices 100 and 101. Master table 800 is stored in recording judgment unit 206.

FIG. 10 shows an exemplary structure and content of a recording-proxy (REC-PXY) capability table 1000 stored in REC-PXY request management unit 208. Table 1000 stores information collected from proxy-recording devices based on a recording-proxy (REC-PXY) capability table 1500 (described below) stored in each proxy-recording device, so as to be able to identify the proxy-recording devices using unique device IDs (1001, 1003 in FIG. 10). The FIG. 10 example shows a REC-PXY capability table 1002 for a proxy-recording device having the device ID "22360679" and a REC-PXY capability table 1004 for a proxy-recording device having the device ID "01200121".

FIG. 11 shows an exemplary structure and content of a record-presetting (REC-PRST) content 1100 sent from INST-RCPT control unit 210 to recording judgment unit 206, in the case of the user presetting the recording of a broadcast program. REC-PRST content 1100 is structured to include a program ID 1101, which is information uniquely identifying broadcast programs, an image quality 1102 specifying the image quality of recording, and corner indexing 1103 and caption recognition indicating supplementary data to be added to recording data. The FIG. 11 example shows record-presetting data resulting from the user specifying "MPEG2 CBR" image quality, "simple" corner indexing, and "off" caption recognition.

FIG. 12 shows an exemplary structure and content of a record presetting list 1200 stored in REC-PRST storage unit 207. List 1200 is data structured to include a program ID 1201, an image quality 1202, and corner indexing 1203 and caption recognition 1204 indicating supplementary data for adding to recording data. This data, which is information showing the presetting content of recording to be performed by recording device 100, is generated from REC-PRST content 1100. FIG. 12 shows, for example, the storage of a record presetting for a broadcast program whose program ID 1201 is "021230089022000", and in which image quality 1202 is set to "MPEG2 CBR", corner indexing 1203 is set to "simple", and caption recognition 1204 is set to "off".

FIG. 13 shows an exemplary structure and content of a REC-PXY request acceptance list 1300 stored in REC-PXY request management unit 208 of recording device 100. List 1300 is data structured to include a program ID 1301, a proxy management (PXY-MGMT) ID 1302, a proxy-recording (PXY-REC) device ID 1303, an image quality 1304, corner indexing 1305, and caption recognition 1306. List 1300 stores information showing the content of record presettings in relation to which record instructions have been issued to proxy-recording device 101. The PXY-MGMT IDs are identifiers uniquely allocated in proxy-recording device 101 in order to identify recording devices and the content of individual record instructions. The proxy-recording device IDs show the device IDs of proxy-recording devices that have received and accepted record instructions.

FIG. 14 shows an exemplary structure and content of a recording-data (REC-DAT) acquisition list 1400 stored in REC-PXY request management unit 208. List 1400 is data structured to include a program ID 1401, a proxy management (PXY-MGMT) ID 1402, a proxy-recording (PXY-REC) device ID 1403, an image quality 1404, corner indexing 1405, and caption recognition 1406. This data is generated by REC-PXY request management unit 208 when the broadcast of a program whose program ID is shown in list 1400 ends. Recording device 100 performs processing to request proxy-recording device 101 for recording data based of the data in list 1400.

Data: Proxy-Recording Device 101

Next is described the principal data handled in proxy-recording device 101.

A program table 400 (same as program table 400 stored recording judgment unit 206 of recording device 100) is obtained by broadcast reception unit 301 via an EPG or the like, and stored in recording judgment unit 307, allowing for both recording device 100 and proxy-recording device 101 to mutually identify broadcast programs.

FIG. 15 shows an exemplary structure and content of REC-PXY capability table 1500 stored in recording judgment unit 307. Table 1500, which shows data relating to the recording function of proxy-recording device 101, is structured to include an image-quality (IMG-QLTY) capability subtable 1501, a channel-reception (CH-RCPT) capability subtable 1502, a simultaneous-recording (SIM-REC) capability subtable 1503, and a data-supplementing (DAT-SUP) capability subtable 1504, this information being set prior to device 101 being shipped. Description of this structure, being the same as recording capability table 600 stored in recording judgment unit 206 of recording device 100, is omitted here. Unit 307 also stores IMG-QLTY classification master table 902, CRN-INDX classification master table 702, and CPT-RECOG classification master table 802 described above, allowing for both devices 100 and 101 to mutually identify recording-capability related information.

FIG. 16 shows an exemplary structure and content of a recording-proxy (REC-PXY) request management table 1600 stored in REC-PXY management unit 306. Table 1600 is data structured to include a proxy management (PXY-MGMT) ID 1601, a recording device ID 1602, a program ID 1603, an image quality 1604, corner indexing 1605, and caption recognition 1606. This data, which is generated whenever proxy-recording device 101 receives a record instruction, shows the recording device that issued the instruction and the content of the instruction. Note that the device IDs of recording devices are conveyed together with information relating to record instructions. Note also that PXY-MGMT ID 1601, which is an identifier uniquely allocated by REC-PXY management unit 306, is the main key in table 1600.

FIG. 17 shows an exemplary structure and content of a user management table 1703 stored in REC-PXY reception unit 308. Table 1703 is data structured to include a recording device ID 1700, a usage-agreement content 1701, and proxy-history (PXY-HIST) information 1702. This table shows, for every recording device, a usage-agreement content indicating the upper usage limit in terms of a maximum number of usages, a recordable data volume or the like, and information indicating the current usage status of the proxy-recording system. This information is, for example, accumulated in REC-PXY reception unit 308 via network 104 by the provider of proxy-recording device 101. PXY-HIST information 1702 is updated whenever device 101 performs recording in connection with a record instruction.

Usage-agreement content 1701 is data defined by a usage-agreement (USAGE-AGR) master table 1800 as shown in FIG. 18, for example, and can be used in combination with PXY-HIST information 1702 in restricting usage, accounting and the like that relates to recording device 100.

USAGE-AGR master table 1800 is structure to include a course 1801, a usage limit 1802, and a course description 1803. Course 1801 is a classification, decided by the provider of proxy-recording device 101, that relates to the methods available for use of device 101 by recording device 100. Limit 1802 expresses the upper usage limit of device 101 by the user of device 100 in terms of a total usage period, number of usages, or data volume of recording. Course description 1803 is a detailed description of the course content. This information is, for example, accumulated in REC-PXY reception unit 308 via network 104 by the provider of device 101.

FIG. 19 shows an exemplary structure and content of a recording-data (REC-DAT) management table 1900 stored in REC-PXY management unit 306. Table 1900 is structured to include a recording data management (REC-DATMGMT) name 1901, a storage address 1906, a program ID 1902, an image quality 1903, and content indexing 1904 and caption recognition 1905 indicating supplementary data to be added to recording data. This data is added to/updated per recording content by unit 306 on completion of recording. REC-DAT MGMT name 1901 is a name that enables the content of recording data to be uniquely identified. For example, the piece of recording data identified by REC-DAT MGMT name "021230089062000_M2v_C0_T0.mpg" is shown to be an "mpg" extension file relating to a broadcast program having the program ID "021230089062000" recorded at "MPEG2 VBR" quality with "advanced" content indexing and caption recognition set to "off". Storage address 1906 shows the location on the network to which recording data has been saved.

FIG. 20 shows an exemplary structure and content of a recording-data (REC-DAT) acquisition list 2000 stored in REC-PXY management unit 306. List 2000 is structured to include a recording-data (REC-DAT) management name 2001, proxy management (PXY-MGMT) ID 2002, and a recording device ID 2003. This data is generated based on the data (i.e. program ID, image quality, corner indexing, caption recognition) entered in REC-DAT management table 1900 and REC-PXY request management table 1600. This list corresponds generated recording data with the recording device that issued the record instruction.

Overall Operations: Recording Device 100

The operations performed by recording device 100 and proxy-recording device 101 are described below.

Figure 22:
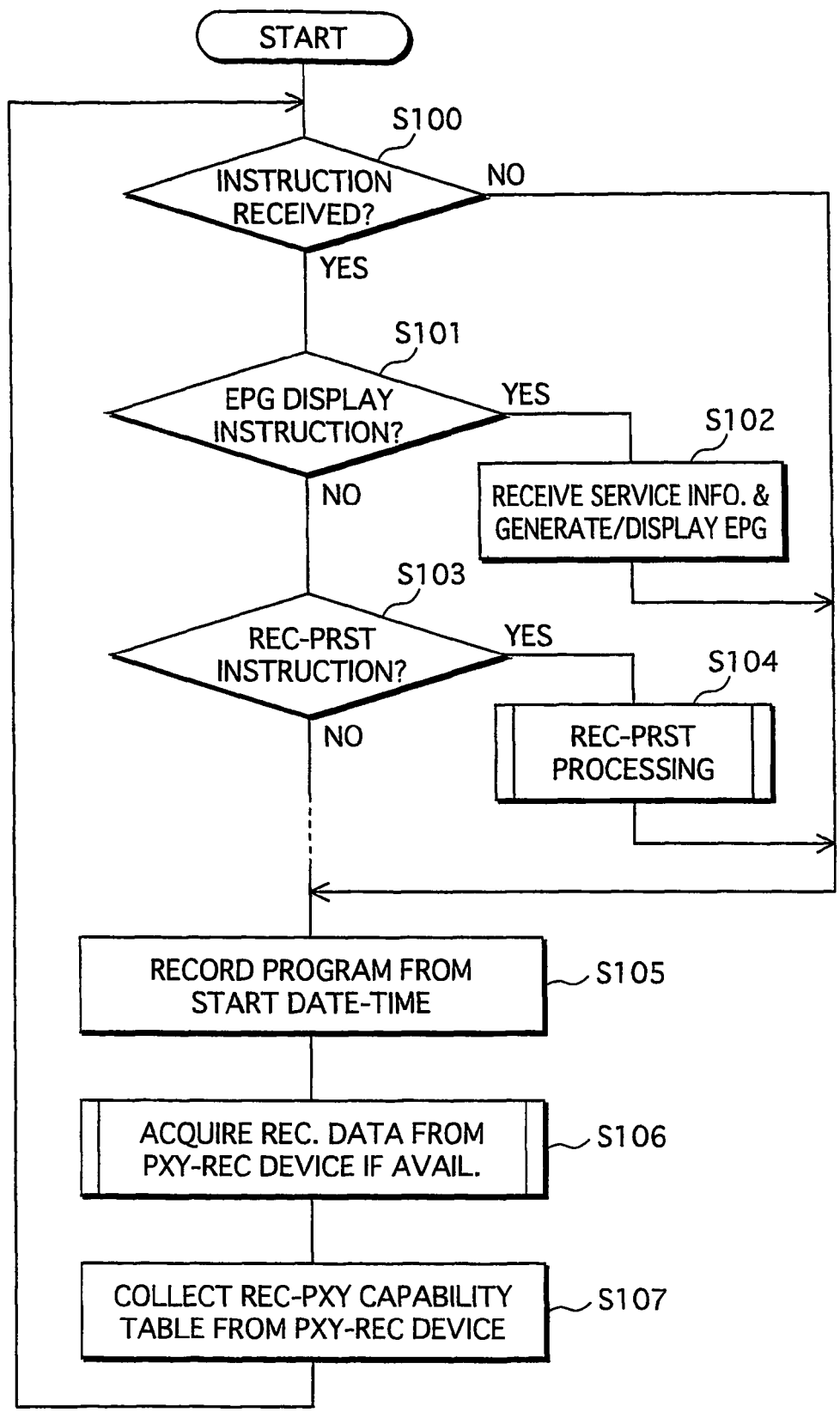
FIG. 22 is a flowchart showing the overall operations of recording device 100.

FIG. 22 is a flowchart showing the overall operations of recording device 100.

Recording device 100 repeatedly performs the following series of procedures: On receipt of an input by a user via the user interface of the operation panel of device 100, remote 217 or the like (step S100), device 100 performs processing in response to the content of the input (steps S101-S104). If the input relates to a preset broadcast program that is recordable internally (i.e. by device 100), device 100 records the program from the broadcast start time (S105). If there is recording data that can be acquired from proxy-recording device 101, device 100 acquires this data and records the acquired data to REC-DAT storage unit 205 (step S106). Device 100 also collects REC-PXY capability table 1500 from device 101 at predetermined times (i.e. periodically, at power-up times, etc). While FIG. 22 shows the EPG-display and record-presetting operations, device 100 is additionally able to perform the user-input call operations performed by conventional set-top boxes.

The overall operations of recording device 100 will now be described in detail. INST-RCPT control unit 210 of device 100, on receipt of a user input (step S100), performs processing in response to the input. If the user instructs EPG display by selecting a button for EPG display on remote 217, for example (step S101), unit 210 conveys an EPG display instruction to display control unit 209. On receipt of this instruction, unit 209 receives an EIT from broadcast reception unit 201, generates an image showing the EPG based on the received EIT, and performs an output to have display unit 216 display the generated image (step S102).

Alternatively, if the user presets the recording of a broadcast program by selecting a button for record presetting on remote 217 after choosing one of the broadcast programs in the EPG displayed by display unit 216, for example (step S103), unit 210 conveys REC-PRST content 1100 instructed by the record presetting to recording judgment unit 206, and in response, unit 206 performs the record-preset processing described in a later section (step S104).

Figure 21:
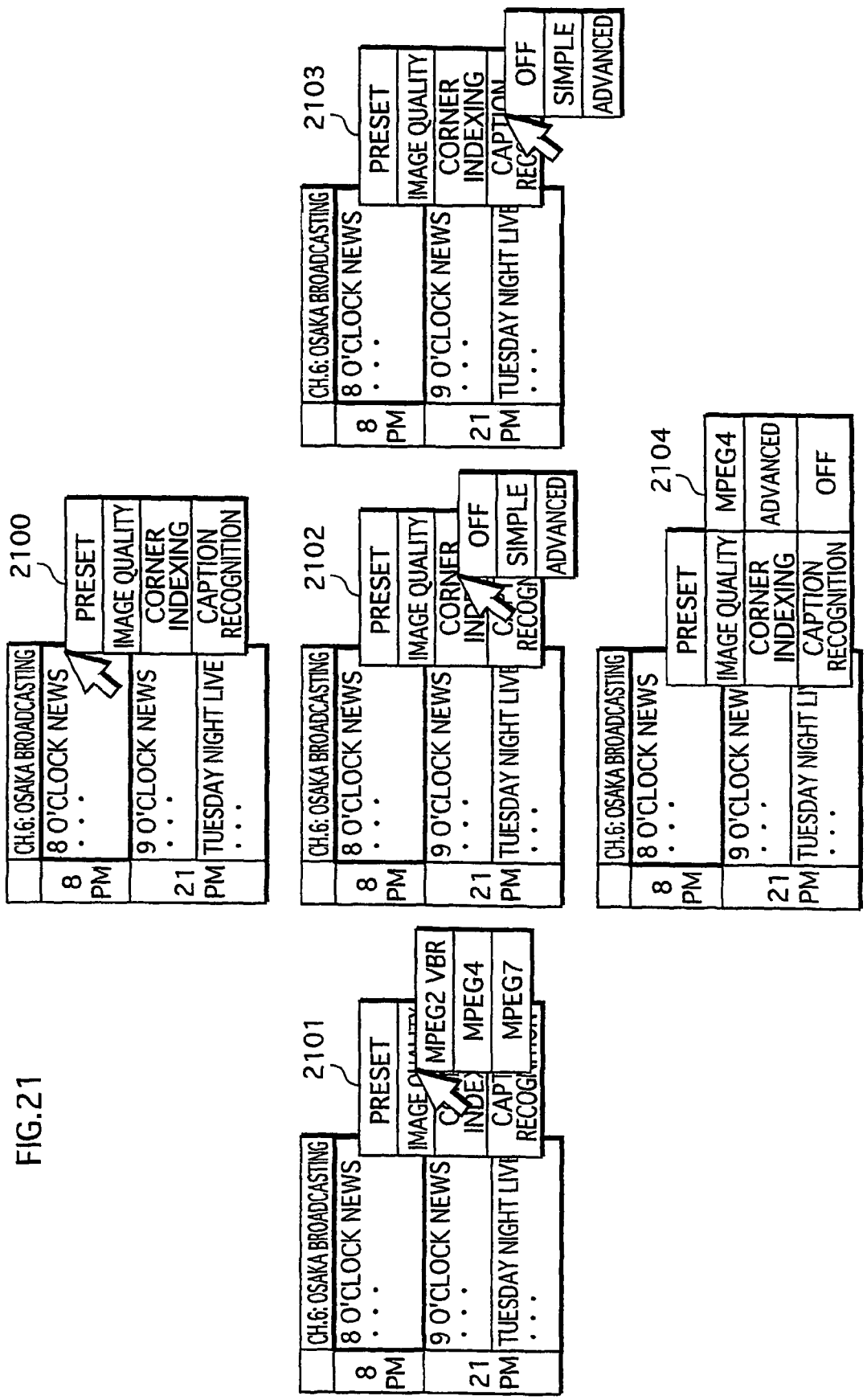
FIG. 21 shows exemplary GUIs displayed on a display unit 216.

Exemplary operations relating to a record-presetting instruction by the user are described in detail here, using FIG. 21. FIG. 21 shows exemplary GUIs (graphical user interfaces) displayed on display unit 216. The exemplary display conducted when, as described above, the user selects a broadcast program from an EPG displayed by display unit 216 in response to an EPG-display instruction given by the user depressing the EPG-display button of remote 217 and depresses the record-presetting button of remote 217, is display 2100. This display for setting the image quality, corner indexing and caption recognition appears above the selected program. Selecting one of these setting items and depressing the OK button on remote 217, for example, results in the selection candidates corresponding to the selected item being shown respectively as exemplary displays 2101 to 2103. The selection candidates for the setting items display the complete recording capabilities of devices 100 and 101 as entered in recording capability table 600 and REC-PXY capability table 1000. Note that when displaying the candidates, it is possible to emphasize those candidates relating to the capabilities of recording device 100 in comparison to those of other devices by using different colors for the respective display parts, for example, thus enabling the user to make a visual distinction.

Once the user has set all of these items and confirmed the presetting by, for example, depressing the OK button on remote 217, as shown in exemplary display 2104, INST-RCPT control unit 210 generates a REC-PRST content 1100 showing the processing content of the record presetting set and confirmed by the user, and conveys the generated content to recording judgment unit 206. Display 2104 shows an example in which the user has confirmed the presetting of a broadcast program from 20:00 to 21:00 with the image quality set to "MPEG4", corner indexing set to "advanced" and caption recognition set to "off".

Recording control unit 203 in recording device 100 controls broadcast reception unit 201 to commence receiving and recording the video and audio data structuring the broadcast program set in record presetting list 1200 as a result of the processing performed in response to the above user instruction when the broadcast time is reached, and to stop the receiving and recording at the end of the broadcast (step S105). Note that at the completion of recording, unit 203 deletes the information in list 1200 relating to recorded programs.

Note that if an instruction has not been received at step S100, recording device 100 moves to step S105 processing.

As described in a later section, if there is a broadcast program in REC-PXY request acceptance list 1300 whose broadcast as ended, REC-PXY request management unit 208 conveys a signal to proxy-recording device 101 in order to acquire the recording data of the program, and if, in response to this signal, information showing the storage address on the network of the recording data is conveyed from device 101 via communication network 104, unit 208 conveys this address information to recording control unit 203. Having received the address information, unit 203 acquires the recording data via network connection unit 204 using the HTTP and FTP protocols, for example, and conveys an instruction to recording unit 202, which is to record the acquired data to REC-DAT storage unit 205. As a result, the recording data is stored in unit 205 (step S106).

Also, at step S107, REC-PXY request management unit 208 requests proxy-recording device 101 for REC-PXY capability table 1500 at predetermined times (e.g. periodically, at power-up times, etc). When table 1500 is sent in response to this request, unit 208 enters (i.e. stores) the received table in REC-PXY capability table 1000.

Overall Operations: Proxy-Recording Device 101

Figure 23:
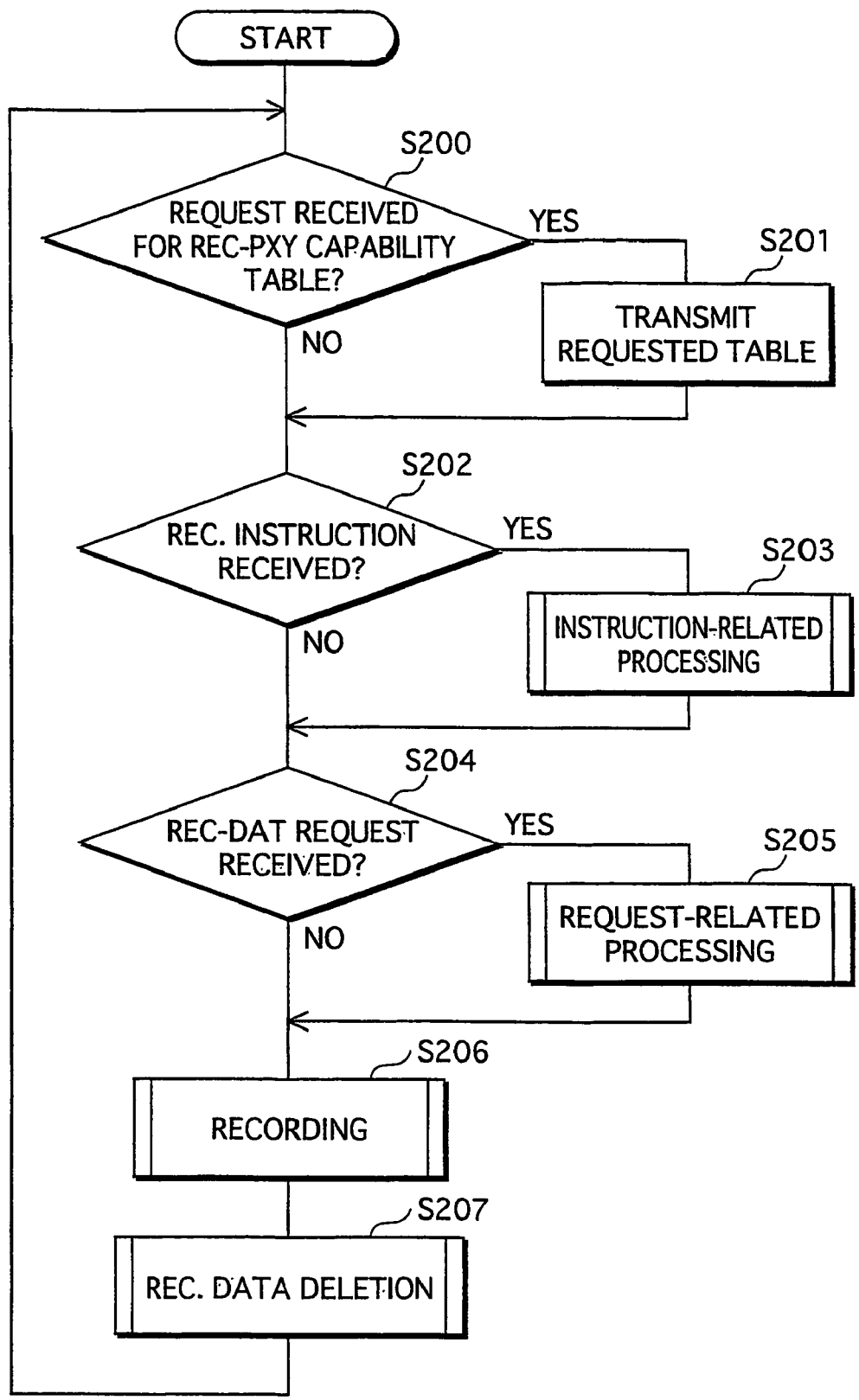
FIG. 23 is a flowchart showing the overall operations of proxy-recording device 101.

FIG. 23 is a flowchart showing the overall operations of proxy-recording device 101.

Proxy-recording device 101 receives and performs processing based on instructions sent from recording device 100. Specifically, on receipt by REC-PXY reception unit 308 of a record instruction from recording device 100, device 101 performs instruction-related processing (described below) at step S203, and processing to control the various components of device 101 and have recording executed.

On receipt of a request for REC-PXY capability table 1500 from recording device 100, REC-PXY reception unit 308 acquires table 1500 from recording judgment unit 307 and sends the acquired table to device 100 (step S201).

On receipt of a request for recording data from recording device 100, REC-PXY management unit 306 performs related processing (described below) at step S205.

When, after the above processing operations, the broadcast date-time of a program shown in REC-PXY request management table 1600 stored in REC-PXY management unit 306 is reached, recording control unit 303 performs record processing (described below) at step S206.

When a signal indicating the end of recording data acquisition is received from recording device 100, proxy-recording device 101, in response, performs processing (described below) to delete the recording data (step S207).

A detailed description of the operations performed by devices 100 and 101 is given below in the following order:

Step S104: record-preset processing (device 100);
Step S203: record-instruction related processing (device 101);
Step S206: record processing (device 101);
Step S106: recording-data acquisition processing (device 100);
Step S203: recording-data acquisition request related processing (device 101); and
Step S207: recording-data deletion processing (device 101)

Record-Preset Processing in Device 100

Figure 24:
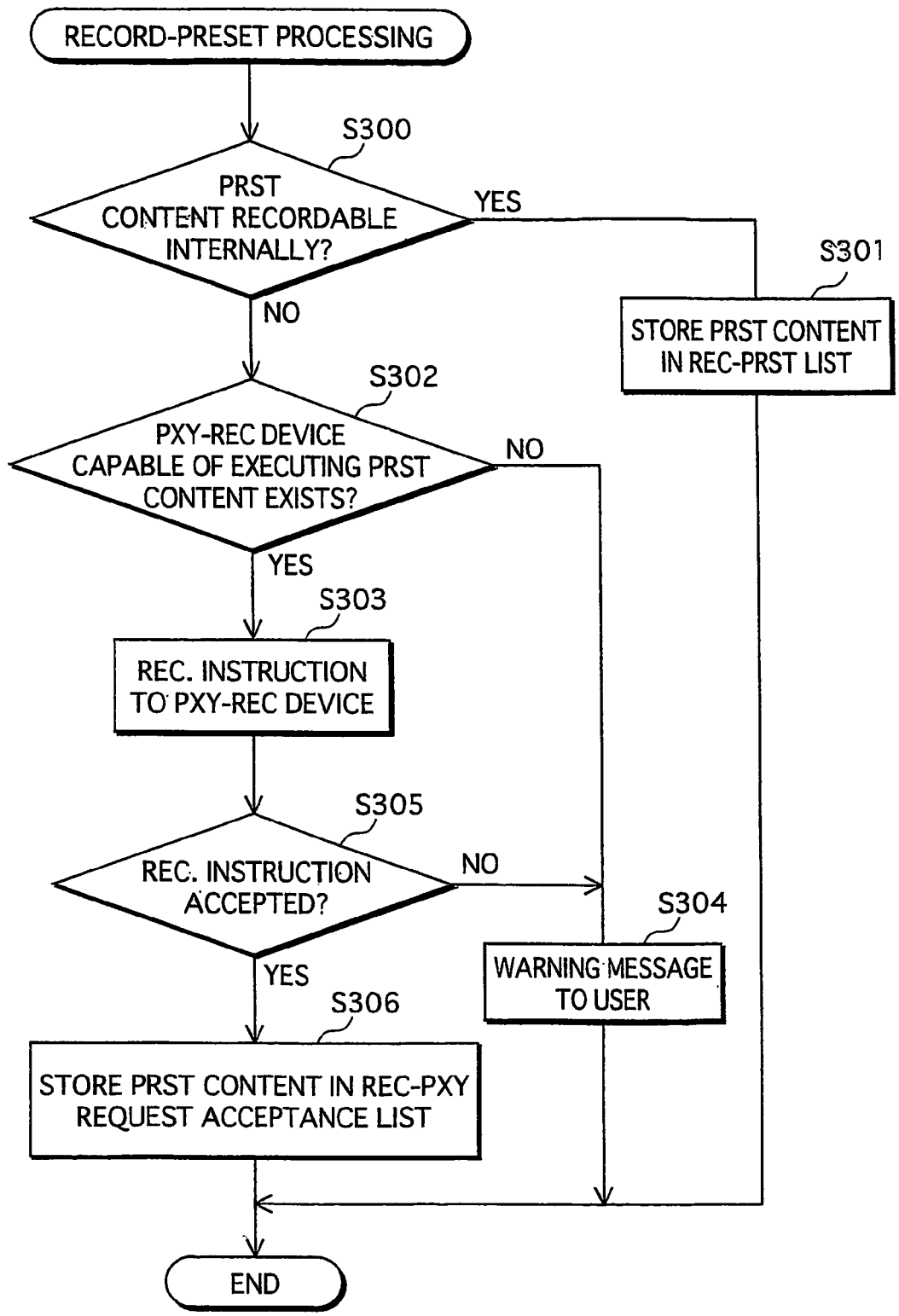
FIG. 24 is a flowchart showing processing performed by recording device 100 to preset recording.

FIG. 24 is a flowchart showing the processing performed by recording device 100 to preset recording. When a record-presetting content 1100 is conveyed from INST-RCPT control unit 210, recording judgment unit 206 firstly determines whether device 100 is capable of recording in accordance with the presetting content (step S300).

Figure 25:
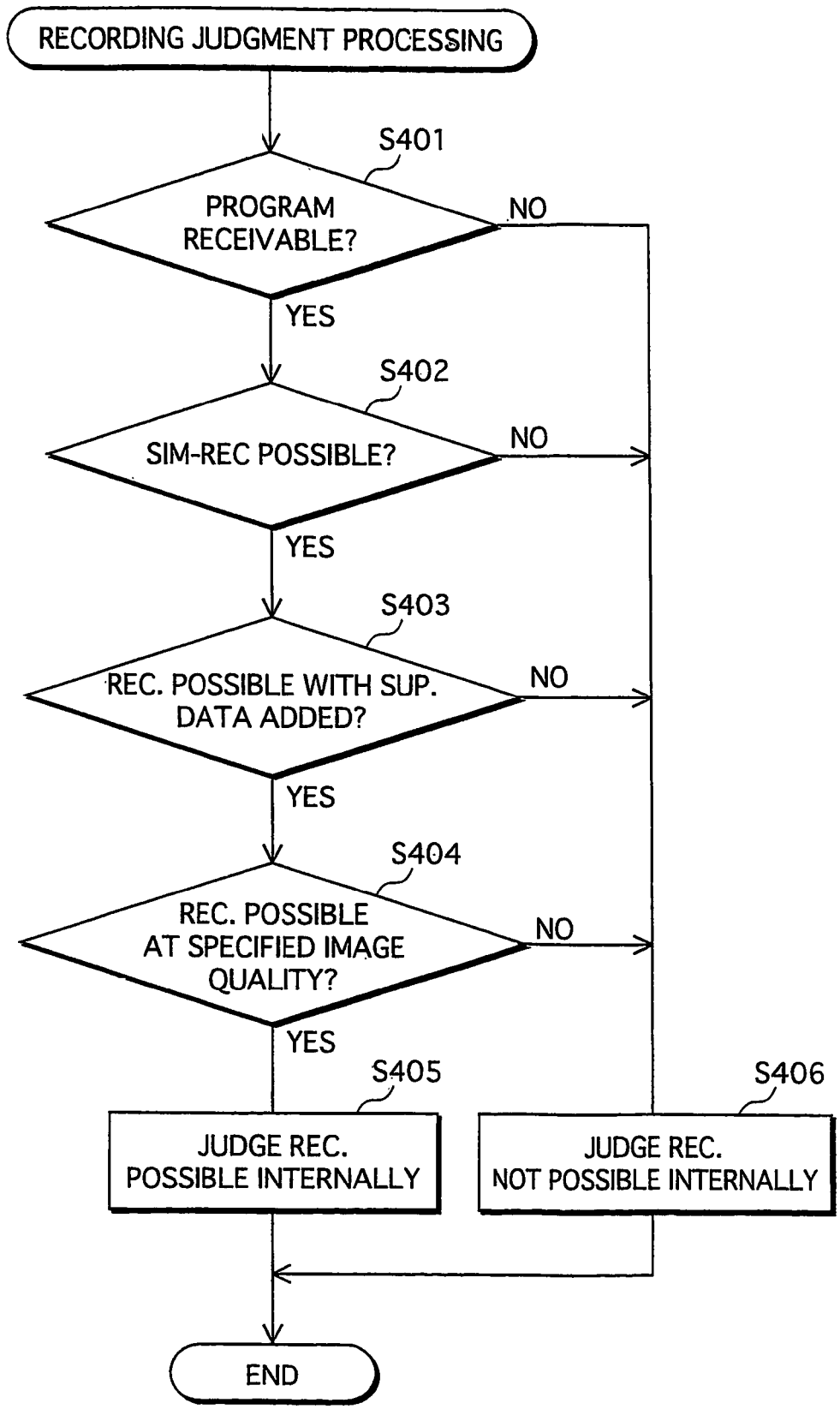
FIG. 25 is a flowchart showing recording judgment processing performed by recording device 100.

This determination is described in detail here, using FIG. 25. As shown in FIG. 25, the record determination is structured from four steps, being the determinations by BCST-RCPT judgment unit 211 (step S401), SIM-REC judgment unit 214 (step S402), SUP-DAT judgment unit 213 (step S403), and REC-QLTY judgment unit 212 (step S404). These determinations are performed through a comparison of recording capability table 600, REC-PRST content 1100, and record presetting list 1200 stored in REC-PRST storage unit 207.

Using program ID 1101 specified by REC-PRST content 1100, BCST-RCPT judgment unit 211 deduces the region ID of the broadcast region in which the specified program will be broadcast from program table 400 and channel information table 500, and determines whether the specified program can be received and recorded internally (i.e. by recording device 100), depending on whether or not the inferred region ID is entered in CH-RCPT capability subtable 602 in recording capability table 600 (step S401).

Using program ID 1101 specified by REC-PRST content 1100, SIM-REC judgment unit 214 acquires the broadcast timeslot of the specified program from program table 400, and acquires, from among the programs shown in record presetting list 1200 stored in REC-PRST storage unit 207, the number of programs whose broadcast timeslot overlaps with the broadcast timeslot of the specified program. Unit 214 then determines whether the specified program can be recorded internally, depending on whether or not a value calculated by adding the record-presetting number "1" to the acquired number exceeds the value of SIM-REC number 607 shown in SIM-REC capability subtable 603 of recording capability table 600 (step S402).

SUP-DAT judgment unit 213 refers to DAT-SUP capability subtable 604 in recording capability table 600 in determining whether recording device 100 is capable of performing the recording with the supplementary data specified by corner indexing 1103 and caption recognition 1104 in REC-PRST content 1100 added (step S403). Specifically, unit 213 determines whether the recording can be performed internally with the supplementary data in REC-PRST content 1100 included, depending on whether or not the specified supplementary data is entered in subtable 604.

REC-QLTY judgment unit 212 refers to IMG-QLTY capability subtable 601 in recording capability table 600 in determining whether recording device 100 is capable of performing the recording at the image quality specified by image quality 1102 in REC-PRST content 1100 (step S404). Specifically, unit 212 determines whether the recording can be performed internally at the image quality specified in REC-PRST content 1100, depending on whether or not the specified image quality is entered in subtable 601.

If it is determined for all of the above judgments that recording is possible internally (step S405), recording judgment unit 206 stores REC-PRST content 1100 in record presetting list 1200 (step S301). On the other hand, if it is determined for any of the above judgments that recording is not possible internally (step S406), recording judgment unit 206 conveys REC-PRST content 1100 to REC-PXY request management unit 208 and instructs unit 208 to request an external proxy-recording device to perform the recording. Having received the instruction, unit 208 proceeds to step S302 and performs processing that includes sending a record instruction to proxy-recording device 101.

Specifically, REC-PXY request management unit 208, on receiving REC-PRST content 1100 from recording judgment unit 206 and being instructed to have an external proxy-recording device perform the recording, reads REC-PXY capability table 1000 and selects a proxy-recording device capable of performing the recording in accordance with all of the conditions specified by REC-PRST content 1100 (step S302). Unit 208 then transmits a record instruction that includes REC-PRST content 1100 and the device ID of recording device 100 to the selected proxy-recording device 101 via communication network 104 (step S303). Note, however, that in the case of it not being possible to select a proxy-recording device capable of performing the recording in accordance with all of the conditions specified by REC-PRST content 1100 (step S302=NO), unit 208 instructs display control unit 209 to issue a warning to the user indicating that the specified record presetting cannot be accepted, and has display unit 216 display the warning (step S304).

Having received the record instruction signal, proxy-recording device 101 performs recording-instruction related processing (described below) at step S203, and sends a signal to recording device 100 that reflects the result of the step S203 processing, and in response, REC-PXY request management unit 208 in device 100 performs the following processing.

If a signal is received from proxy-recording device 101 showing the rejection of a record instruction (step S305=NO), REC-PXY request management unit 208 perform an output to have display unit 216 display information indicating that the record instruction was not accepted, together with the reason for rejection (step S304).

Note here that in the case of there being a plurality of proxy-recording devices capable of performing the recording in accordance with all of the conditions specified by REC-PRST content 1100, REC-PXY request management unit 208 transmits a record instruction to one proxy-recording device at a time in order, and has the device that accepts the record instruction first perform the proxy recording. The method of selecting one device in the case of there being a plurality of proxy-recording devices capable of performing the specified recording may be methods other than that described above.

If a signal is received from proxy-recording device 101 showing the acceptance of a record instruction (step S305=YES), REC-PXY request management unit 208 adds information relating to the content of the record instruction to REC-PXY request acceptance list 1300 together with the content of the record presetting, the PXY-MGMT ID received from the proxy-recording device, and the device ID of the proxy-recording device, and stores the updated table 1300 in REC-PRST storage unit 207 (step S306).

Record-Instruction Related Processing in Device 101

Figure 26:
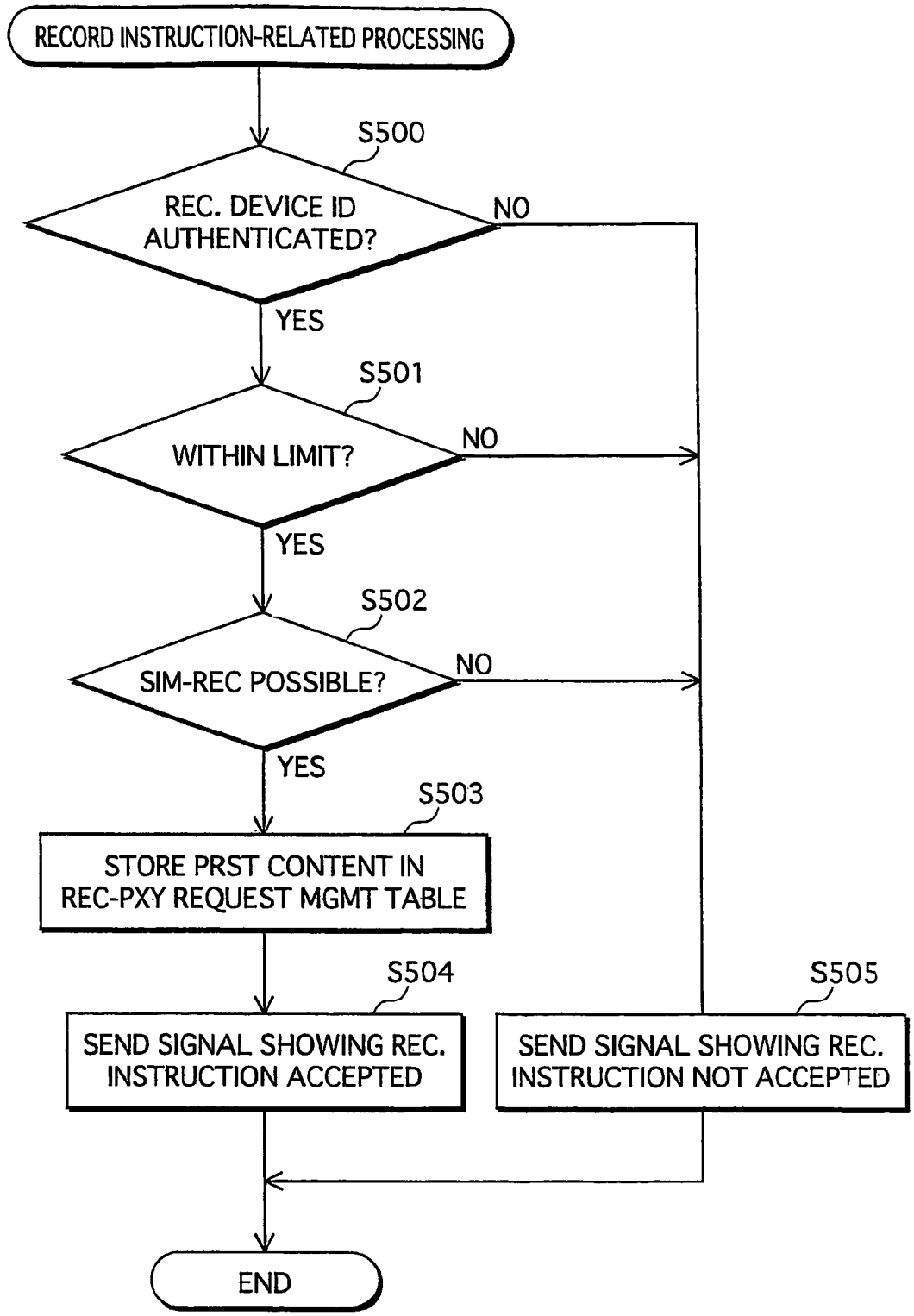
FIG. 26 is a flowchart showing processing performed by proxy-recording device 101 in response to a record instruction.

The following description relates to the processing (step S203) performed in proxy-recording device 101 in response to a record instruction received from recording device 100. FIG. 26 is a flowchart of this processing. Firstly, REC-PXY reception unit 308 in device 101 determines whether to authenticate device 100 depending on whether or not the recording device ID included in the record instruction signal conveyed from device 100 is entered in recording device ID 1700 of user management table 1703 (step S500). If not entered, authentication is determined to have failed (step S500=NO), and unit 308 conveys an error response value to device 100 indicating the rejection of the record instruction, together with the reason for rejection and the device ID of proxy-recording device 101 (step S505), before ending the processing.

If the device ID of recording device 100 is entered in device ID 1700 of user management table 1703 (step S500=YES), REC-PXY reception unit 308 then refers to usage-agreement content 1701 and PXY-HIST information 1702 in table 1703 to check whether the usage limit set by usage-arrangement content 1701 will be exceeded if the recording instructed by the received REC-PRST content 1100 is performed (step S501). For example, if the restriction is in terms of recording time as with the time-period restriction course, unit 308 deduces the broadcast time period of the broadcast program shown by REC-PRST content 1100 from program table 400, adds the deduced broadcast period to the corresponding time period shown in PXY-HIST information 1702, and checks that the resultant time period does not exceed the time period limit set by usage-arrangement content 1701. If exceeded (step S501=NO), unit 308 conveys an error response value to recording device 100 indicating the rejection of the record instruction, together with the reason for rejection and the device ID of proxy-recording device 101 (step S505), before ending the processing.

Alternatively, if the restriction is in terms of recorded data volume as with the data-volume restriction course, for example, REC-PXY reception unit 308 deduces the broadcast time period of the broadcast program shown by REC-PRST content 1100 from program table 400, estimates the data volume that would result from recording being conducted for the deduced time period at the image quality specified in REC-PRST content 1100, and checks that the result of adding the estimated data volume to the corresponding data volume shown in PXY-HIST information 1702 does not exceed the data volume limit set by usage-arrangement content 1701. If exceeded (step S501=NO), unit 308 conveys an error response value to recording device 100 indicating the rejection of the record instruction, together with the reason for rejection and the device ID of proxy-recording device 101 (step S505), before ending the processing.

Alternatively again, if the restriction is in terms of the number of recordings as with the usage-count restriction course, for example, REC-PXY reception unit 308 checks that a value obtained by adding "1" to the corresponding count value shown in PXY-HIST information 1702 does not exceed the usage count limit set by usage-arrangement content 1701. If exceeded (step S501=NO), unit 308 conveys an error response value to recording device 100 indicating the rejection of the record instruction, together with the reason for rejection and the device ID of proxy-recording device 101 (step S505), before ending the processing.

If determined based the device ID of recording device 100 and user management table 1703 that the limit set in usage-arrangement content 1701 is not exceeded (step S501=YES), REC-PXY reception unit 308 conveys REC-PRST content 1100 to recording judgment unit 307, and in response, unit 307 determines at step S502 whether the recording specified by content 1100 is executable internally (i.e. by proxy-recording device 101).

Specifically, recording judgment unit 307 acquires the program ID in REC-PRST content 1100 and the broadcast timeslot of the specified broadcast program from program table 400, and also acquires the number of recordings to be performed within the same broadcast timeslot, from the record presettings entered in REC-PXY request management table 1600, which is stored in REC-PXY management unit 306. Unit 307 then determines whether a value obtained by adding "1" (i.e. for the record instruction currently under consideration) to the acquired recording number is less than or equal to the SIM-REC number shown in SIM-REC capability subtable 1503 of REC-PXY capability table 1500 (step S502). If the SIM-REC number is exceeded (step S502=NO), unit 306 conveys information indicating this fact to REC-PXY reception unit 308, and in response, unit 308 conveys an error response value to recording device 100 indicating the rejection of the record instruction, together with the reason for rejection and the device ID of proxy-recording device 101 (step S505), before ending the processing.

If REC-PRST content 1100 is determines at step S502 to be recordable internally (step S502=YES), REC-PXY management unit 306 appends the device ID of the recording device that issued the record instruction to content 1100 and allocates a PXY-MGMT ID, before adding this information to REC-PXY request management table 1600 (step S503). Unit 306 also conveys a normal reply value to recording device 100 indicating acceptance of the record instruction, together with the device ID of proxy-recording device 101 and the allotted PXY-MGMT ID 1601 (step S504), before ending the processing.

Record Processing in Device 101

Figure 27:
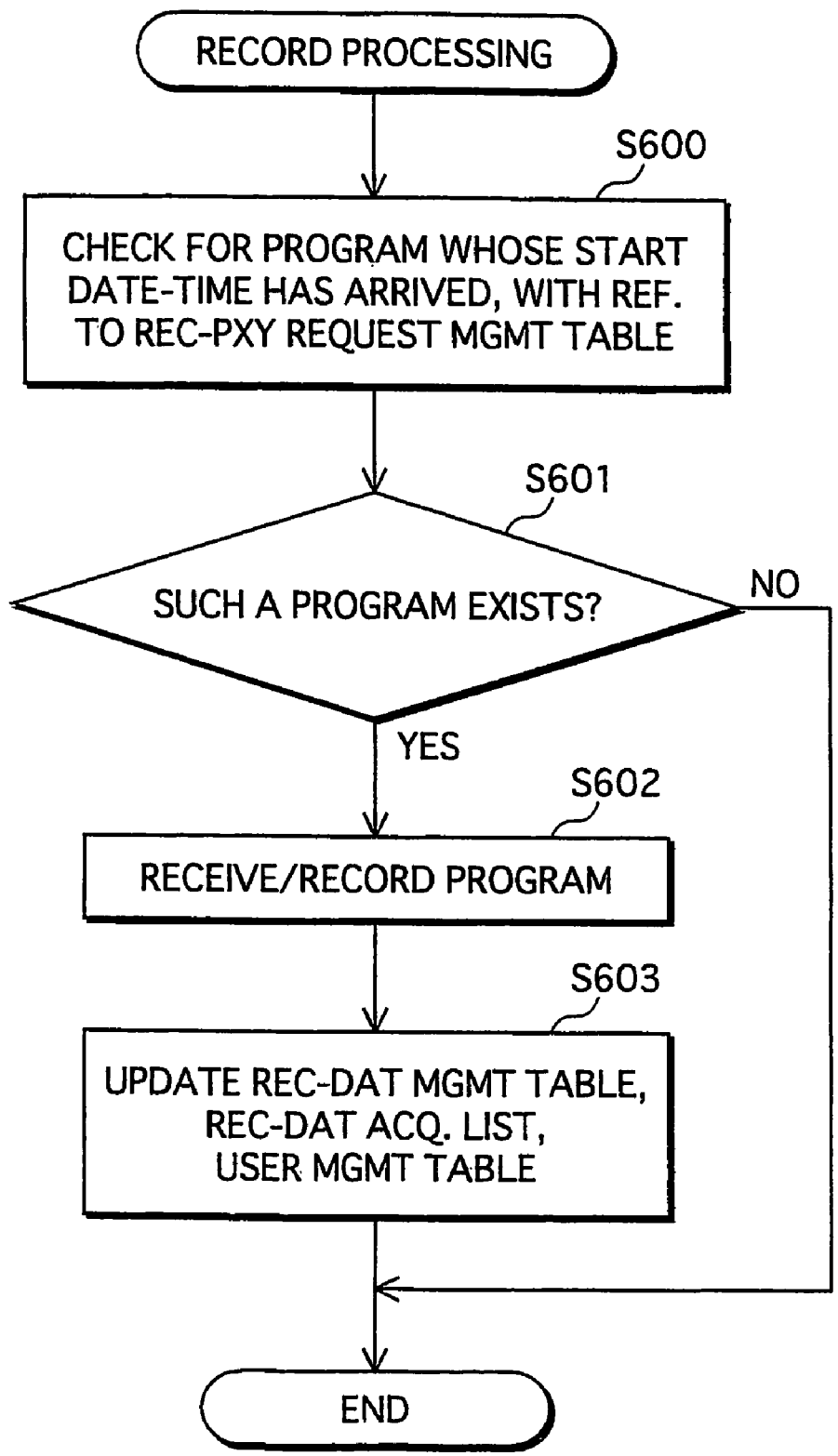
FIG. 27 is a flowchart showing record processing performed by proxy-recording device 101.

The following description relates to the record processing (step S206) performed in proxy-recording device 101. FIG. 27 is a flowchart of this processing. Recording control unit 303 in device 101 refers to program table 400 in relation to broadcast programs shown in REC-PXY request management table 1600 stored in REC-PXT MGMT unit 306 to check whether the broadcast date-time of a broadcast program preset for recording has arrived (step S600). If the broadcast date-time of a program has arrived (step S601=YES), unit 303 controls broadcast reception unit 301 to receive the broadcast program, and instructs recording unit 302 to perform recording in accordance the corresponding image quality, corner indexing and caption recognition shown in table 1600, and in response, unit 302 performs the recording and stores the recording data to which any specified supplementary data has been appended in REC-DAT storage unit 305 (step S602). On completion of the recording (i.e. at the end of the broadcast time period), unit 303 notifies REC-PXY management unit 306 that recording has ended. In response, unit 306 allocates a REC-DAT MGMT name identifying the recording content of the recording data stored in unit 305, writes the allocated REC-DAT MGMT name 1901, recording content (1902-1905), and storage address 1906 of the recording data to REC-DAT management table 1900, and adds the above REC-DAT MGMT name, a PXY-MGMT ID 2002 identifying the recording device and the content of the record instruction, and data relating to the device ID 2003 of the recording device that instructed the recording to REC-DAT acquisition list 2000, so as to update table 2000. Unit 306 also adds the time period, usage count and data capacity of REC-DAT storage unit 305 involved in the recording to PXY-HIST information 1702, so as to update user management table 1703 (step S603). On the other hand, if determined at step S601 that the broadcast date-time of a program has not been reached (step S601=NO), unit 303 ends the record processing.

Recording-Data Acquisition Processing in Device 100

Figure 28:
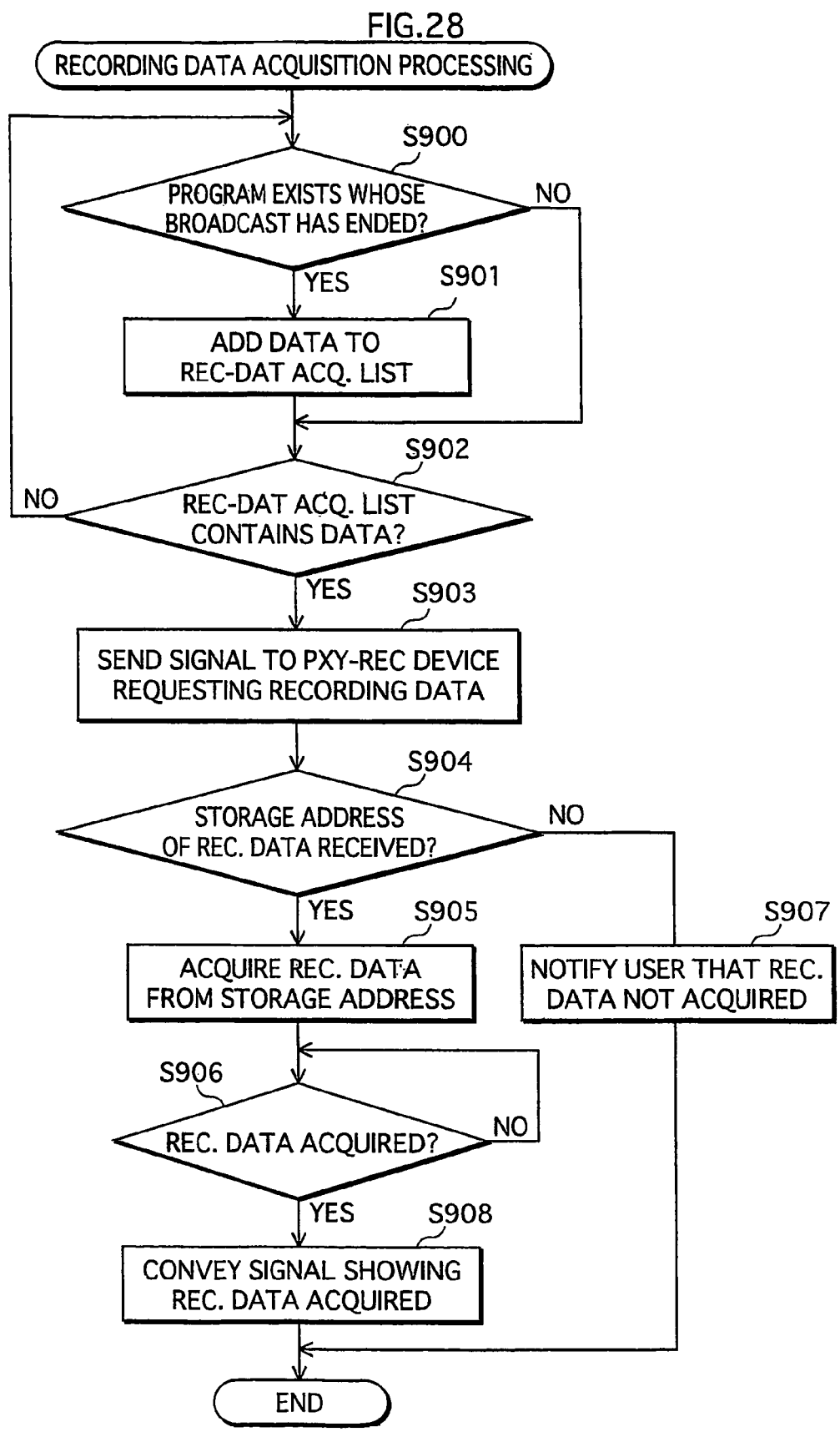
FIG. 28 is a flowchart showing processing performed by recording device 100 to acquire recording data.

The following description relates to processing (step S106) performed in recording device 100 to acquire recording data. FIG. 28 is a flowchart of this processing. REC-PXY request management unit 208 refers to REC-PXY request acceptance list 1300 and program table 400 to check whether the broadcast of any of the programs shown in table 1300 has ended (step S900). Unit 208 moves to the step S902 processing if there are not any programs whose broadcast has ended (step S900=NO) and moves to the step S901 processing if there is a program whose broadcast has ended (step S900=YES). At step S901, unit 208 adds the information in list 1300 that relates to the program whose broadcast has ended to REC-DAT acquisition list 1400. At step S902, unit 208 refers to list 1400, and if there is data in list 1400 (step S902=YES), unit 208 selects the maximum amount of recording data that can be acquired at anyone time, and sends to the proxy-recording device identified by REC-PXY device ID 1403 a signal requesting the acquisition of recording data, the signal including the PXY-MGMT ID 1402 of the requested data and the device ID of recording device 100 (step S903). Here, the maximum amount of recording data simultaneously acquirable may be a figure that is specified by the user or decided automatically in device 100 by estimating in advance the speed of the circuit of communication network 104 to which device 100 is connected.

If the storage address of recording data is received from proxy-recording device 101 (step S904=YES), REC-PXY request management unit 208 conveys the received address to recording control unit 203, and in response, unit 203 commences the acquisition of recording data shown by the storage address, and recording unit 202 accumulates the acquired data in REC-DAT storage unit 205 (step S905). The HTTP and FTP protocols, for example, are used in this acquisition. Once the acquisition has been completed (step S906=YES), unit 208 conveys a signal to device 101 indicating that the acquisition of recording data has been completed, the signal including the device ID of recording device 100 and the PXY-MGMT ID 1402 of the acquired data (step S908), and ends the processing. If, at step S904, a signal is received that shows that the recording data specified in the request cannot be acquired (step S904=NO), unit 208 sends the user of this fact via display unit 216, for example (step S907), before ending the processing.

Recording-Data Request Related Processing in Device 101

Figure 29:
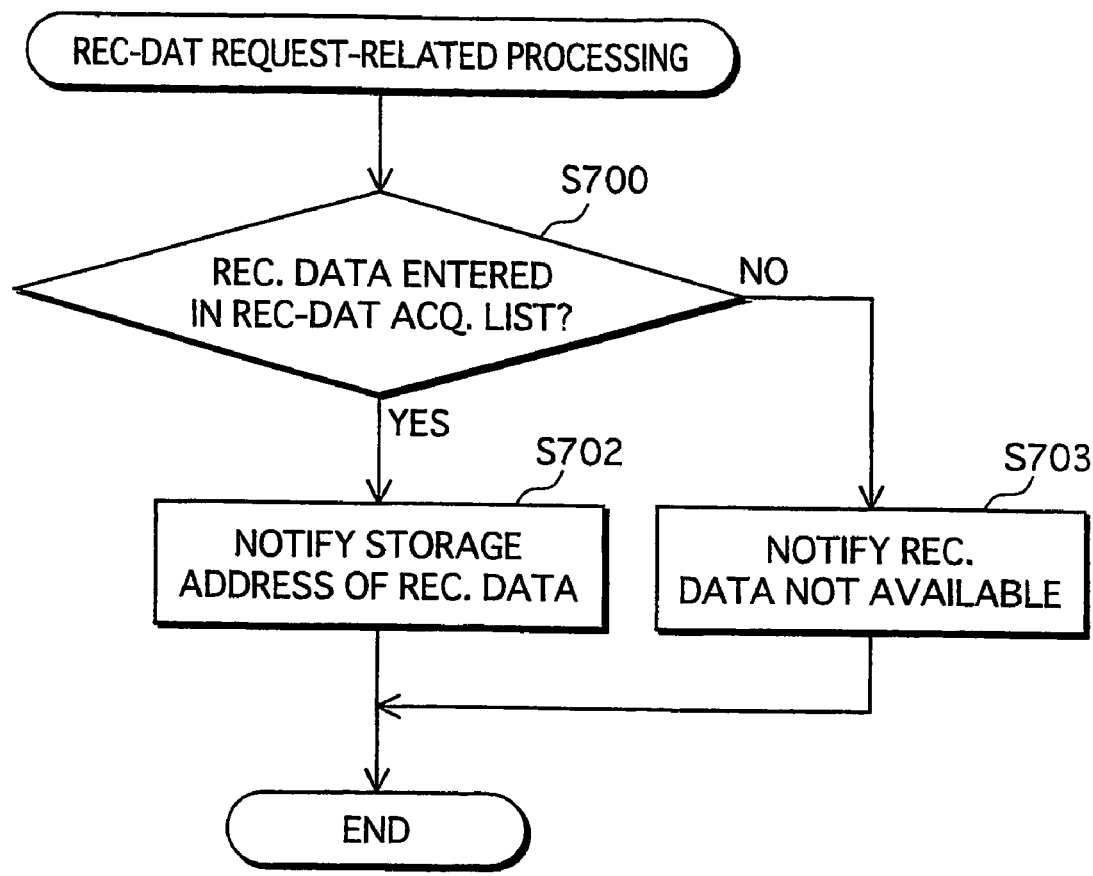
FIG. 29 is a flowchart showing processing performed by proxy-recording device 101 in response to a request for recording data.

The following description relates to processing (step S205) performed in proxy-recording device 101 in response to a request for recording data. FIG. 29 is a flowchart of this processing. On receipt of a signal from recording device 100, indicating a request for acquisition of recording data, that includes the device ID of device 100 and PXY-MGMT ID 1402, REC-PXY management unit 306 checks whether data having the same device ID 2003 as the received device ID and the same PXY-MGMT ID 2002 as the received PXY-MGMT ID 1402 is entered in REC-DAT acquisition list 2000 (step S700). If not entered in list 2000 (step S700=NO), unit 306 conveys a signal to device 100 indicating that the recording data cannot be acquired (step S703), before ending the processing. If such data is entered in list 2000 (step S700=YES), unit 306 refers to REC-DAT management table 1900 using REC-DAT management name 2001, acquires storage address 1906 of the recording data, and notifies the acquired address to device 100 (step S702), before ending the processing.

Recording-Data Deletion Processing in Device 101

Figure 30:
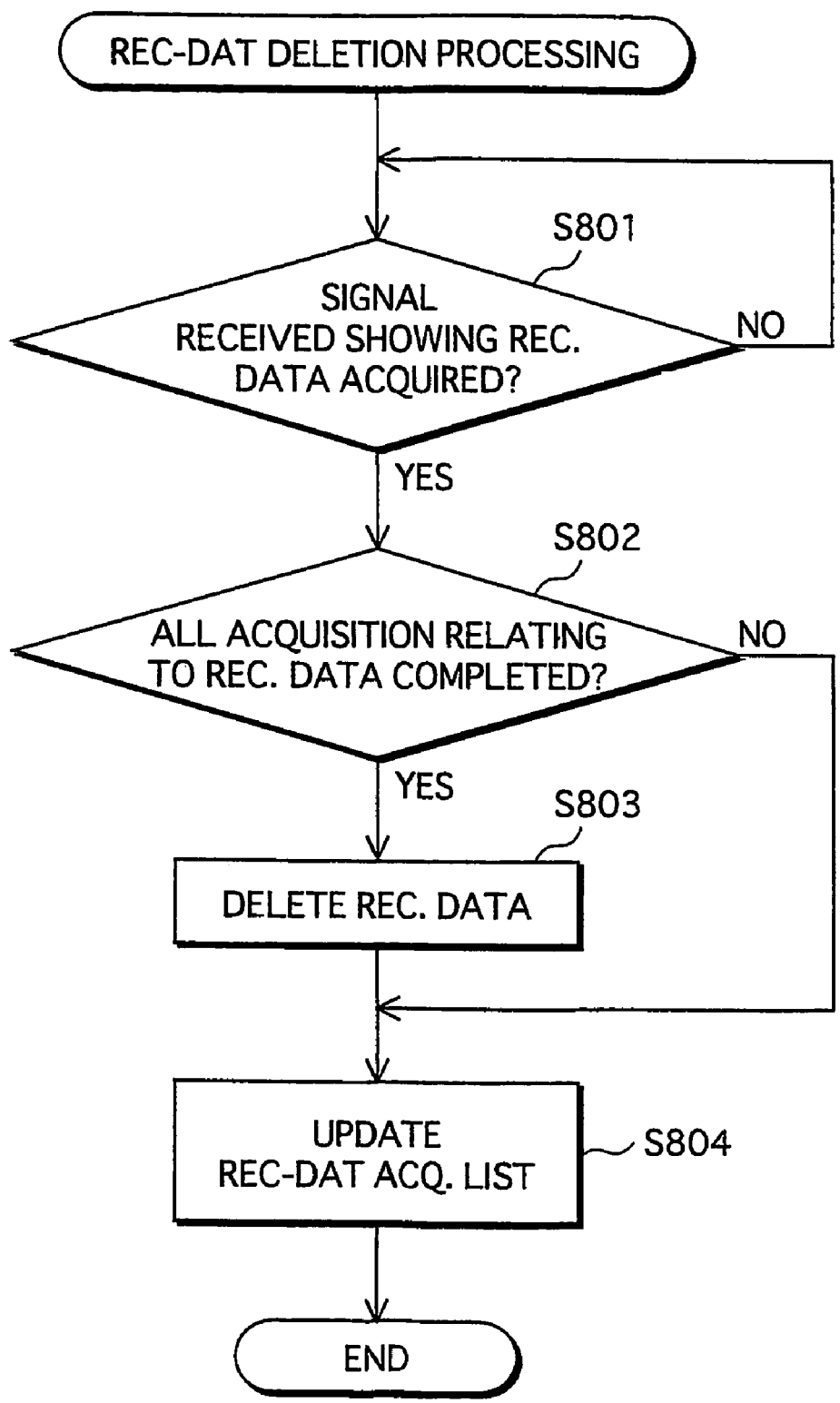
FIG. 30 is a flowchart showing processing performed by proxy-recording device 101 to delete recording data.

The following description relates to processing (step S207) performed in proxy-recording device 101 to delete recording data. FIG. 30 is a flowchart of this processing. On receipt from recording device 100 of a signal, indicating the completion of recording-data acquisition, that includes the device ID of device 100 and PXY-MGMT ID 1402 (step S801=YES), REC-PXY management unit 306 searches REC-DAT acquisition list 2000 for any other data having the same REC-DAT management name as the REC-DAT management name identified by the received PXY-MGMT ID but a different device ID from the received device ID (i.e. checks for recording data yet to be acquired that relates to a record instruction with the same recording content but issued to device 101 by a different recording device). If there is no such data (step S802=YES), unit 306 reads storage address 1906 in REC-DAT management table 1900 and deletes the recording data, since the lack of any such data shows that data acquisition relating to the specified recording data has been fully completed (step S803). Unit 306 also deletes data specified by the received PXY-MGMT ID 1402 from REC-DAT acquisition list 2000 (step S804). On the other hand, if, at step S802, data having the same REC-DAT MGMT name exists (step S802=NO), unit 306 deletes data specified by the received PXY-MGMT ID 1402 from REC-DAT acquisition list 2000, without deleting the recording data (step S804), and ends the processing.

Exemplary Communication Between Devices 100 and 101

Figure 31:
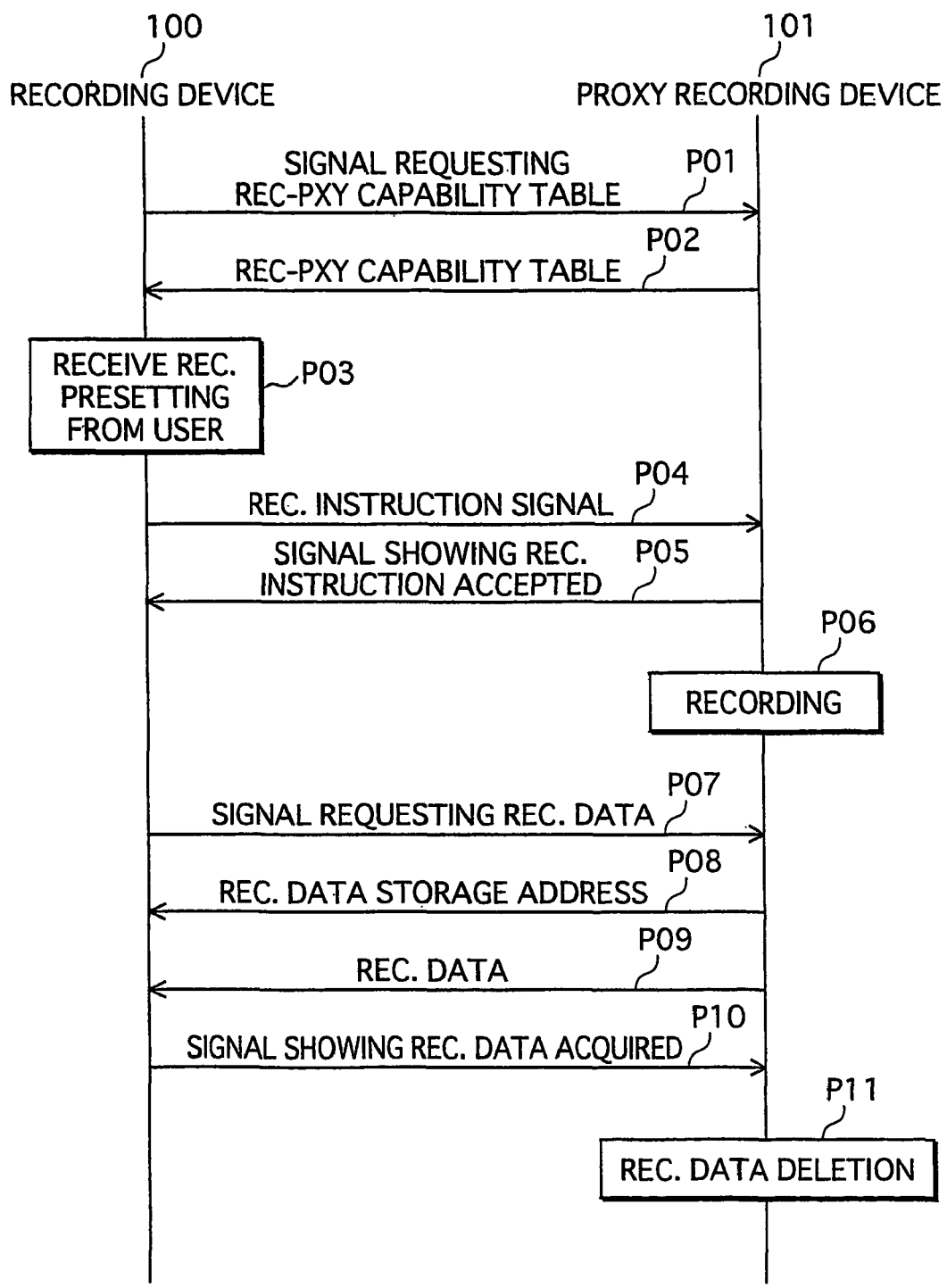
FIG. 31 shows a data communication sequence between devices 100 and 101.

The following is a simple example of the operations of devices 100 and 101 as described above, following the order in which communication is carried out between the devices. Note that this description relates to processing performed under normal circumstances. FIG. 31 shows a data communication sequence between devices 100 and 101.

Firstly, recording device 100 conveys a signal to proxy-recording device 101 at a predetermined time (periodically, at power-up times, etc), in order to acquire REC-PXY capability table 1500 (P01), and in response, device 101 conveys table 1500 to device 100 (P02). Then, if the user of device 100 presets device 100 to record a broadcast program A, for example (P03), device 100, depending on REC-PRST content 1100, conveys a signal to device 101 indicating a record instruction (P04). Device 101, having received this signal, determines whether recording is possible, and conveys a signal to device 100 indicating acceptance of the record instruction (P05). Having accepted the record instruction, device 101 receives and records program. A from the beginning until the end of the broadcast (P06).

Next, when the broadcast period of program A has ended, recording device 100 conveys a signal to proxy-recording device 101 requesting acquisition of the recording data (P07). In reply, device 101 sends the storage address of the recording data of program A to device 100 (P08), enabling device 100 to acquire the recording data from the storage address using the HTTP and FTP protocols, for example (P09). Having completed acquisition of the recording data, device 100 sends a signal to device 101 indicating the completion of recording-data acquisition (P10), and in response, device 101 deletes the recording data of program A (P11).

Embodiment 2

The following description relates to a recording device having a proxy-recording function in an embodiment 2 of the present invention.

Structure

A recording device 3200 having a proxy-recording function according to embodiment 2, as shown in FIG. 32, incorporates the functional structures of both recording device 100 and proxy-recording device 101, as described in detail in embodiment 1. Device 3200 is capable of not only issuing record instructions to an external proxy-recording device 101 in response to the content of record presettings received from a user, but of also receiving record instructions from an external recording device 100.

A recording control unit 3201 includes the functions of both recording control units 203 and 303 described in embodiment 1, while a recording judgment unit 3202 includes the functions of both recording judgment units 206 and 307 described in embodiment 1. Otherwise, the same reference numerals as in FIGS. 2 and 3 are used for those elements in FIG. 32 that are similar to elements in devices 100 and 101 shown in embodiment 1. A detailed of description of these elements is omitted here.

Data

The data structure of data handled by recording device 3200 is similar to that described in embodiment 1 using FIGS. 4 to 20.

Operations

The detailed operations of the various elements of recording device 3200 are comparable to the operations performed by the elements of devices 100 and 101 shown in embodiment 1.

Related Matters

The present invention, while being described above in terms of recording and proxy-recording devices, is of course not limited to these embodiments. The present invention also includes the following.

(1) In realizing the present invention, broadcast program transmission may be by surface waves, satellite waves, or wireless/cable communication channels, with no distinction being made between digital and analogue broadcasts.

(2) In realizing the present invention, recording device 100 and proxy-recording device 101 may be devices that record radio broadcasts rather than broadcast programs.

(3) In FIG. 1, broadcast waves may be transmitted directly from broadcast station 105 to the recording and proxy-recording devices, rather than via broadcast relay station 106.

(4) The number of recording and proxy-recording devices is not limited to the numbers shown in FIG. 1, any number of recording and proxy-recording devices being possible.

(5) In addition to the data used in corner indexing and caption recognition given as examples of supplementary data to be added to recording data in the above embodiments, other possible types of supplementary data include, for example, data used in the automatic recognition, extraction and indexing of audio data, face-recognition data used in identifying people from facial images extracted from video data, and the digest video data of broadcast programs.

(6) If the user makes no selections from the setting items for image quality, corner indexing, and caption recognition when setting the recording content as shown in FIG. 21, a predetermined recording content may be selected and set.

(7) Although the above description relates to restrictions being applied on the usage of proxy-recording device 101 using user management table 1703 and USAGE-AGR master table 1800 (step S501), the step S501 judgment may be discarded so as to provide unlimited usage.

(8) In relation to the acquisition of recording data by recording device 100, it is possible for a priority level of each piece of recording data for acquisition to be set by a user input, for example, and for the recording data to be acquired in an order determined in accordance with these priority levels.

(9) While proxy-recording device 101 is described above as recording broadcast programs in accordance with instructions from recording device 100, device 101 may record all receivable programs and then delete the programs that device 100 does not instruct to be recorded.

(10) The functions of proxy-recording device 101 described in embodiment 1 may, as shown in FIG. 33, be realized by a recording proxy management device 3300 and a plurality of proxy recording terminals (3301, 3302), device 3300 being constituted from a recording-proxy management unit 306, a recording judgment unit 307, a recording-proxy reception unit 308 and a network connection unit 304, and each terminal being constituted from a broadcast reception unit 301, a recording-data storage unit 305, recording unit 302, recording control unit 303 and a network connection unit 304.

The same reference numerals are used for elements in FIG. 33 that are similar to elements in devices 100 and 101 shown in embodiment 1. Detailed description of these elements is omitted here.

(11) The present invention may be methods as shown by the above. These methods may be computer programs realized by a computer, or digital signals constituted from the computer programs.

(12) It is also possible to distribute computer programs, either recorded on recording media or via any of a variety of communication channels, for causing a computer or a set-top box having a program execution function to execute the processing orders (i.e. the orders shown in FIGS. 22-31, etc) performed in recording device 100, proxy-recording device 101, and recording device 3200 having a proxy recording function, as shown in embodiments 1 and 2. The distributed computer programs may be provided for use by installation on the computer or set-top box, and the computer or set-top box may execute the installed programs to realize the functions of devices 100, 101 and 3200 as shown in embodiments 1 and 2.

(13) In the case of a negative determination being returned at either of steps S302 and S305 (S302 or S305=NO), recording device 100 as described above is structured to display a warning to the user and abandon execution of the record presetting. However, the following alternative processing is also possible.

Specifically, if determined in the negative at either step S302 or step S305, recording device 100 may partially change the conditions specified in REC-PRST content 1100, and again conduct the step S302 and step S305 determinations. In this way, the record presetting is performed either by device 100 or a proxy-recording device 101 capable of recording at the REC-PRST content after the change in conditions, depending on the result of the determination.

As methods of partially changing the conditions specified in REC-PRST content 1100, it is possible, for example, to (1) remove one of the three setting items (i.e. image quality, corner indexing, caption recognition) from the conditions, and/or (2) reduce the setting levels of these three items (i.e. reduce the image quality, change "advanced" to "simple", etc). The step S302 or S305 judgment may be repeated while altering the conditions a little at a time, until a device capable of performing the recording is found. In other words, it is sufficient for the record presetting to be performed by a recording device or proxy-recording device capable of executing the recording at conditions as close as possible to those specified in REC-PRST content 1100.

Alternatively, recording device 100 may, in the case of a negative determination being returned at either of steps S302 and S305, refer to recording capability table 600 and REC-PXY capability table 1000 to locate one or more devices, out of devices 100 and 101, that is capable of recording at a capacity closest to the conditions specified in REC-PRST content 1100, display the processing capabilities of the one or more located devices in list form, have the user select one of the processing capabilities from this list, and have the device to which the selected processing capability relates perform the record presetting.

(14) The present invention may be any combination of the above embodiments and variations.

The present invention is useable as a recording device for receiving broadcasts and recording received broadcasts on recording media such as hard disk and DVD.

The invention claimed is:

1. A recording device for use with one or more external devices, the recording device comprising:
   a receiving unit configured to receive a record instruction specifying a processing content for recording a broadcast program from a user, the record instruction including information indicating a recording format;
   a collecting unit configured to collect second capability information that relates to a recording capability of the one or more external devices and includes information indicating a recording format in which the one or more external devices are capable of recording;
   a judging unit configured to determine, with reference to prestored first capability information that relates to a recording capability of the recording device and includes information indicating a recording format in which the recording device is capable of recording, whether the recording device satisfies predetermined conditions, which include at least a first recording condition of whether recording can be performed in the recording format shown by the record instruction;
   a recording unit configured to receive and record the broadcast program in accordance with the processing content if the judging unit determines that the predetermined conditions are satisfied by the recording device;
   a selecting unit configured to select an external device that satisfies the predetermined conditions including at least the first recording condition using the collected second capability information if the judging unit determines that the predetermined conditions are not satisfied by the recording device; and
   a communication unit configured to convey the record instruction to the selected external device, wherein
   the record instruction further includes information specifying corner indexing as supplementary data for adding to the processing content,
   the first capability information further includes information indicating whether the recording device is capable of recording with the addition of the corner indexing,
   the second capability information further includes information indicating whether the one or more external devices are capable of recording with the addition of the corner indexing,
   the predetermined conditions are satisfied when both of the first recording condition and a second recording condition are satisfied, the second recording condition indicating whether recording can be preformed with the addition of the corner indexing in the recording device, and
   the selecting unit selects an external device that satisfies both of the first recording condition and the second recording condition, based on the collected second capability information, if the judging unit determines that both of the first recording condition and the second recording condition are not satisfied by the recording device.

2. The recording device of claim 1, wherein
   the record instruction further includes information specifying image recognition information as supplementary data for adding to the processing content,
   the first capability information further includes information indicating whether the recording device is capable of recording with the addition of the image recognition information,
   the second capability information further includes information indicating whether the one or more external devices are capable of recording with the addition of the image recognition information,
   the predetermined conditions are satisfied when both of the first recording condition and a second recording condition are satisfied, the second recording condition indicating whether recording can be performed with the addition of the image recognition information in the recording device, and
   the selecting unit selects an external device that satisfies both of the first recording condition and the second recording condition, based on the second capability information, if the judging unit determines that both of the first recording condition and the second recording condition are not satisfied by the recording device.

3. The recording device of claim 1, wherein
   the record instruction further includes information specifying the broadcast program for recording,
   the first capability information further includes information indicating a broadcast program receivable by the recording device,
   the second capability information further includes information indicating a broadcast program receivable by the one or more external devices,
   the predetermined conditions are satisfied when both of the first recording condition and a second recording condition are satisfied, the second recording condition indicating whether the specified broadcast program is receivable by the recording device, and
   the selecting unit selects an external device that satisfies both of the first recording condition and the second recording condition, based on the collected second capability information, if the judging unit determines that both of the first recording condition and the second recording condition are not satisfied by the recording device.

4. The recording device of claim 1 further comprising:
   a requesting unit configured to (i) monitor whether the selected external device to which the record instruction has been conveyed has completed the recording according to the recording instruction, and (ii) request the selected external device to transmit the recorded broadcast program when determining that the recording according to the recording instruction has been completed; and
   a second recording unit configured to (i) receive the broadcast program transmitted from the selected external device in response to the request, and (ii) record the received broadcast program to a recording medium.

5. The recording device of claim 1, wherein
   the record instruction further includes one or more presetting conditions,
   the predetermined conditions are satisfied when the first recording condition and all of the one more presetting conditions are satisfied,
   the recording device further comprises a recording-execution unit configured to, if the judging unit determines that none of the recording device and the one or more external devices are able to execute the processing content, (i) exclude at least one condition from the first recording condition and the one or more presetting conditions, and (ii) select a device from among the recording device and the one or more external devices, with reference to the first capability information and the second capability information, that satisfies the first recording condition and the one or more presetting conditions, excluding the at least one condition, wherein the recording-execution unit causes the recording device to perform the recording when the selected device is the recording device, and wherein the recording-execution unit causes the communication unit to convey the record instruction to the selected external device when the selected device is one of the one or more external devices.

6. A proxy-recording device for use with an external device, the proxy-recording device comprising:

a capability-disclosing unit configured to convey, to the external device, capability information that relates to a recording capability of the proxy-recording device and includes information indicating a recording format in which the proxy-recording device is capable of recording;

a proxy-receiving unit configured to receive a record instruction specifying a processing content for recording a broadcast program from the external device, the record instruction including the recording format; and a proxy-recording unit configured to (i) receive the broadcast program according to the received record instruction, and (ii) record the received broadcast program in a recording medium using the recording format, wherein the capability information further includes information indicating if the proxy-recording device is capable of recording with an addition of corner indexing, the record instruction further includes information specifying the corner indexing as supplementary data for adding to the processing content, and the proxy-recording unit records the received broadcast program with the addition of the corner indexing.

7. The proxy-recording device of claim 6, wherein the capability information further includes information indicating if the proxy-recording device is capable of recording with an addition of image recognition information, the record instruction further includes information specifying the image recognition information as supplementary data for adding to the processing content, and the proxy-recording unit records the received broadcast program with the addition of the image recognition information.

8. The proxy-recording device of claim 6, wherein the capability information further includes information indicating a broadcast program receivable by the proxy-recording device, the record instruction further includes information specifying the broadcast program for recording, and the proxy-recording unit receives the specified broadcast program and records the received broadcast program in the recording medium using the recording format.

9. The proxy-recording device of claim 7, further comprising:

a request-receiving unit configured to receive a request for transmitting the recorded broadcast program from the external device after the proxy-receiving unit has received the record instruction and the proxy-recording unit has completed the recording according to the record instruction, and a transmission unit configured to transmit the recorded broadcast program which has been recorded in the recording medium to the external device in response to the received request.

10. A recording method for a recording device used with one or more external devices, the recording method comprising the steps of:

receiving a record instruction specifying a processing content for recording a broadcast program from a user, the record instruction including information indicating a recording format;

collecting second capability information that relates to a recording capability of the one or more external devices and includes information indicating a recording format in which the one or more external devices are capable of recording;

determining, with reference to prestored first capability information that relates to a recording capability of the recording device and includes information indicating a recording format in which the recording device is capable of recording, whether the recording device satisfies predetermined conditions, which include at least a first recording condition of whether recording can be performed in the recording format shown by the record instruction;

receiving and recording the broadcast program in accordance with the processing content if a result of the determining is that the recording device does satisfy the predetermined conditions;

selecting an external device that satisfies the predetermined conditions including at least the first recording condition, based on the collected second capability information if the result of the determining is that the recording device does not satisfy the predetermined conditions; and conveying the record instruction to the selected external device if the result of the determining is that the recording device does not satisfy the predetermined conditions, wherein the record instruction further includes information specifying corner indexing as supplementary data for adding to the processing content, the first capability information further includes information indicating whether the recording device is capable of recording with the addition of the corner indexing, the second capability information further includes information indicating whether the one or more external devices are capable of recording with the addition of the corner indexing the predetermined conditions are satisfied when both of the first recording condition and a second recording condition are satisfied, the second recording condition indicating whether recording can be preformed with the addition of the corner indexing in the recording device, and the selecting step selects an external device that satisfies both of the first recording condition and the second recording condition, based on the collected second capability information, if the determining step determines that both of the first recording condition and the second recording condition are not satisfied by the recording device.

11. A recording method for a proxy-recording device used with an external device, the recording method comprising the steps of:
- conveying, to the external device, capability information that relates to a recording capability of the proxy-recording device and includes information indicating a recording format in which the proxy-recording device is capable of recording;
- receiving a record instruction specifying a processing content for recording a broadcast program from the external device, the record instruction including the recording format; and
- receiving the broadcast program according to the received record instruction and recording the received broadcast program in a recording medium using the recording format, wherein
- the capability information further includes information indicating if the proxy-recording device is capable of recording with an addition of corner indexing,
- the record instruction further includes information specifying the corner indexing as supplementary data for adding to the processing content, and
- the recording step records the received broadcast program with the addition of the corner indexing.

12. A computer-readable recording medium storing a computer program therein, the computer program for causing a recording device having a CPU to receive and record broadcast programs, the computer program causing the recording device to execute the steps of:
- receiving a record instruction specifying a processing content for recording a broadcast program from a user, the record instruction including information indicating a recording format;
- collecting second capability information that relates to a recording capability of one or more external devices and includes information indicating a recording format in which the one or more external devices are capable of recording;
- determining, with reference to prestored first capability information that relates to a recording capability of the recording device and includes information indicating a recording format in which the recording device is capable of recording, whether the recording device satisfies predetermined conditions, which include at least a first recording condition of whether recording can be performed in the recording format shown by the record instruction;
- receiving and recording the broadcast program in accordance with the processing content if a result of the determining is that the recording device does satisfy the predetermined conditions;
- selecting an external device that satisfies the predetermined conditions including at least the first recording condition, based on the collected second capability information if the result of the determining is that the recording device does not satisfy the predetermined conditions; and
- conveying the record instruction to the selected external device if the result of the determining is that the recording device does not satisfy the predetermined conditions, wherein
- the record instruction further includes information specifying corner indexing as supplementary data for adding to the processing content,
- the first capability information further includes information indicating whether the recording device is capable of recording with the addition of the corner indexing,
- the second capability information further includes information indicating whether the one or more external devices are capable of recording with the addition of the corner indexing
- the predetermined conditions are satisfied when both of the first recording condition and a second recording condition are satisfied, the second recording condition indicating whether recording can be preformed with the addition of the corner indexing in the recording device, and
- the selecting step selects an external device that satisfies both of the first recording condition and the second recording condition, based on the collected second capability information, if the determining step determines that both of the first recording condition and the second recording condition are not satisfied by the recording device.

13. A computer-readable recording medium storing a computer program therein, the computer program for causing a proxy-recording device having a CPU to receive and record broadcast programs, the computer program for causing the proxy-recording device to execute the steps of:
- conveying capability information that relates to a recording capability of the proxy-recording device and includes information indicating a recording format in which the proxy-recording device is capable of recording to an external device;
- receiving a record instruction specifying a processing content for recording a broadcast program from the external device, the record instruction including the recording format; and
- receiving the broadcast program according to the received record instruction and recording the received broadcast program in a recording medium using the recording format, wherein
- the capability information further includes information indicating if the proxy-recording device is capable of recording with an addition of corner indexing,
- the record instruction further includes information specifying the corner indexing as supplementary data for adding to the processing content, and
- the recording step records the received broadcast program with the addition of the corner indexing.

14. An integrated circuit for a recording device used with one or more external devices, the integrated circuit comprising:
- a receiving unit configured to receive a record instruction specifying a processing content for recording a broadcast program from a user, the record instruction including information indicating a recording format;
- a collecting unit configured to collect second capability information that relates to a recording capability of the one or more external devices and includes information indicating a recording format in which the one or more external devices are capable of recording;
- a judging unit configured to determine, with reference to prestored first capability information that relates to a recording capability of the recording device and includes information indicating a recording format in which the recording device is capable of recording, whether the recording device satisfies predetermined conditions, which include at least a first recording condition of whether recording can be performed in the recording format shown by the record instruction;
- a recording unit configured to receive and record the broadcast program in accordance with the processing content if the judging unit determines that the predetermined conditions are satisfied by the recording device;

a selecting unit configured to select an external device that satisfies the predetermined conditions including at least the first recording condition, based on the collected second capability information, if the judging unit determines that the predetermined conditions are not satisfied by the recording device; and a communication unit configured to convey the record instruction to the selected external device if the judging unit determines that the predetermined conditions are not satisfied by the recording device, wherein the record instruction further includes information specifying corner indexing as supplementary data for adding to the processing content, the first capability information further includes information indicating whether the recording device is capable of recording with the addition of the corner indexing, the second capability information further includes information indicating whether the one or more external devices are capable of recording with the addition of the corner indexing the predetermined conditions are satisfied when both of the first recording condition and a second recording condition are satisfied, the second recording condition indicating whether recording can be preformed with the addition of the corner indexing in the recording device, and the selecting unit selects an external device that satisfies both of the first recording condition and the second recording condition, based on the collected second capability information, if the judging unit determines that both of the first recording condition and the second recording condition are not satisfied by the recording device.

* * * * *